(12) United States Patent
Ahmed

(10) Patent No.: US 12,457,489 B2
(45) Date of Patent: Oct. 28, 2025

(54) HANDLING INCOMPATIBLE WIRELESS DEVICES

(71) Applicant: Telefonaktiebolaget LM Ericsson (publ), Stockholm (SE)

(72) Inventor: Saad Naveed Ahmed, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 470 days.

(21) Appl. No.: 17/795,582

(22) PCT Filed: Mar. 10, 2021

(86) PCT No.: PCT/EP2021/056001
§ 371 (c)(1),
(2) Date: Jul. 27, 2022

(87) PCT Pub. No.: WO2021/180765
PCT Pub. Date: Sep. 16, 2021

(65) Prior Publication Data
US 2023/0076425 A1      Mar. 9, 2023

Related U.S. Application Data

(60) Provisional application No. 62/987,536, filed on Mar. 10, 2020.

(51) Int. Cl.
| | | |
|---|---|---|
| *H04W 8/24* | (2009.01) | |
| *H04W 16/14* | (2009.01) | |
| *H04W 76/10* | (2018.01) | |

(52) U.S. Cl.
CPC ............. *H04W 8/24* (2013.01); *H04W 16/14* (2013.01); *H04W 76/10* (2018.02)

(58) Field of Classification Search
CPC ........ H04W 8/24; H04W 76/10; H04W 16/14
(Continued)

(56) References Cited

U.S. PATENT DOCUMENTS 10,548,056 B1    1/2020  Sung et al.
2017/0208454 A1*  7/2017  Knisely ............... H04W 72/541
(Continued)

FOREIGN PATENT DOCUMENTS

WO    2016204676 A1    12/2016

OTHER PUBLICATIONS

International Search Report and Written Opinion dated Sep. 1, 2021 for International Application No. PCT/EP2021/056001 filed Mar. 10, 2021; consisting of 19 pages.
(Continued)

*Primary Examiner* — Joel Ajayi
(74) *Attorney, Agent, or Firm* — Weisberg I.P. Law, P.A.

(57) ABSTRACT

A method, system and apparatus are disclosed for handling incompatible wireless devices. In one embodiment, a method implemented in a network node operating at least one first cell of a first radio access technology (RAT) includes obtaining a WD capability information, the WD capability information indicating whether the WD is capable of at least one spectrum sharing capability; and based at least part on the received WD capability information, determining whether the WD is one of spectrum sharing capable and spectrum sharing incapable. In one embodiment, a method implemented in a wireless device (WD) includes receiving a request for a WD capability information; and as a result of the request, sending the WD capability information to the network node, the WD capability information indicating whether the WD is capable of at least one spectrum sharing capability.

14 Claims, 12 Drawing Sheets

(58) Field of Classification Search
USPC .......................................................... 455/454
See application file for complete search history.

(56) References Cited

U.S. PATENT DOCUMENTS

2019/0305915 A1   10/2019  Zhu et al.
2019/0327630 A1*  10/2019  Lin ........................ H04W 8/22
2020/0163144 A1*   5/2020  Ryoo ..................... H04L 47/82

OTHER PUBLICATIONS

Sribu Marius et al.; Ericsson White Paper; Title: Performance verification for 5G NR deployments; Mar. 2019; consisting of 19 pages.
3GPP TS 38.306 V15.8.0; 3rd Generation Partnership Project; Technical Specification Group Radio Access Network; NR; User Equipment (UE) radio access capabilities; (Release 15); Dec. 2019; consisting of 60 pages.
3GPP TSG RAN WG2 Meeting #95 R2-165128; Title: Support of standalone and non-standalone NR RAN modes; Agenda Item: 9.4.1; Source: KT Corp.; Document for: Discussion and Decision; Date and Location: Aug. 22-26, 2016, Gothenburg, Sweden, consisting of 3 pages.
3GPP TSG-RAN #82 Tdoc RP-182635; Title: Spectrum sharing and corresponding UE capabilities; Agenda Item: 9.6; Source: Ericsson, Telstra, Verizon, T-Mobile USA; Document for: Discussion, Decision; Date and Location: Dec. 10-13, 2018, Sorrento, Italy, consisting of 2 pages.
Patzold, Matthias; Title: Toward Realizing the Full Potential of 5G-Empowered World; Mobile Radio; IEEE Vehicular Technology Magazine; Mar. 2020; consisting of 7 pages.

* cited by examiner

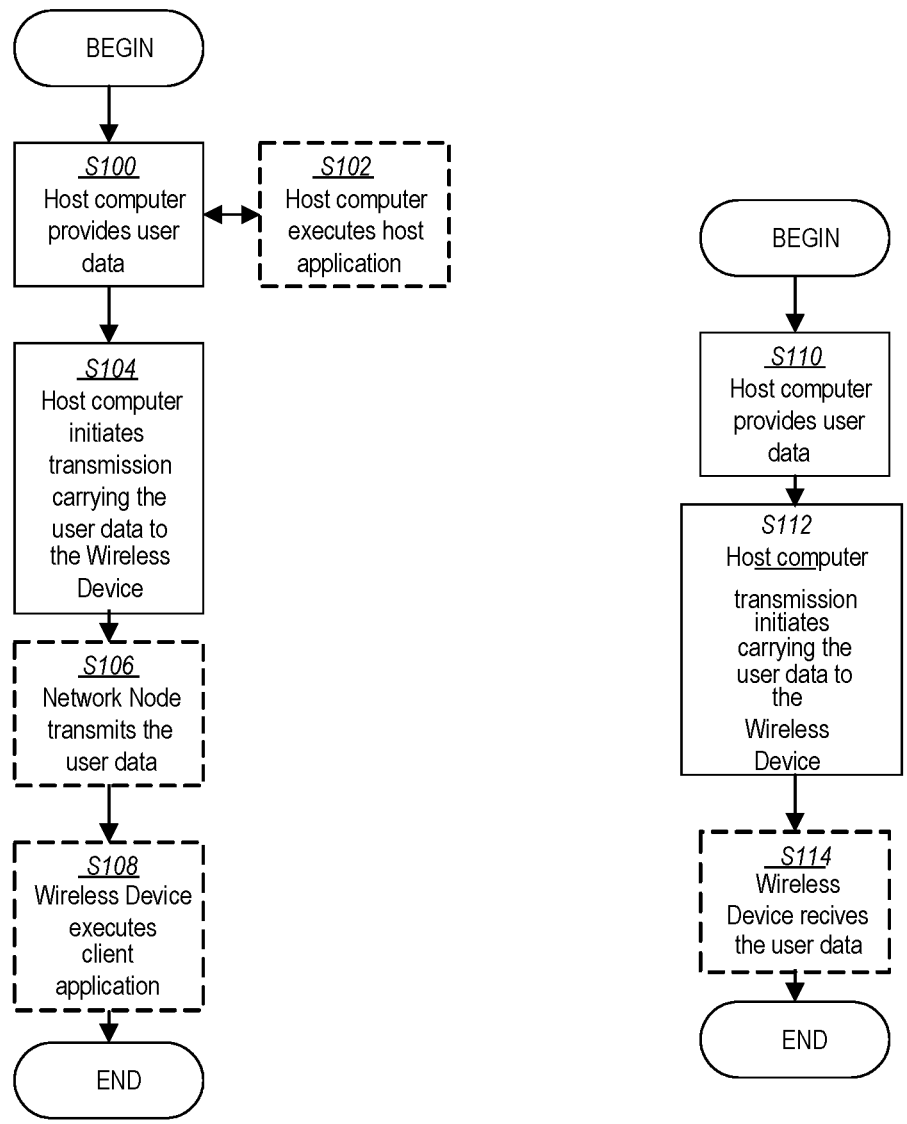

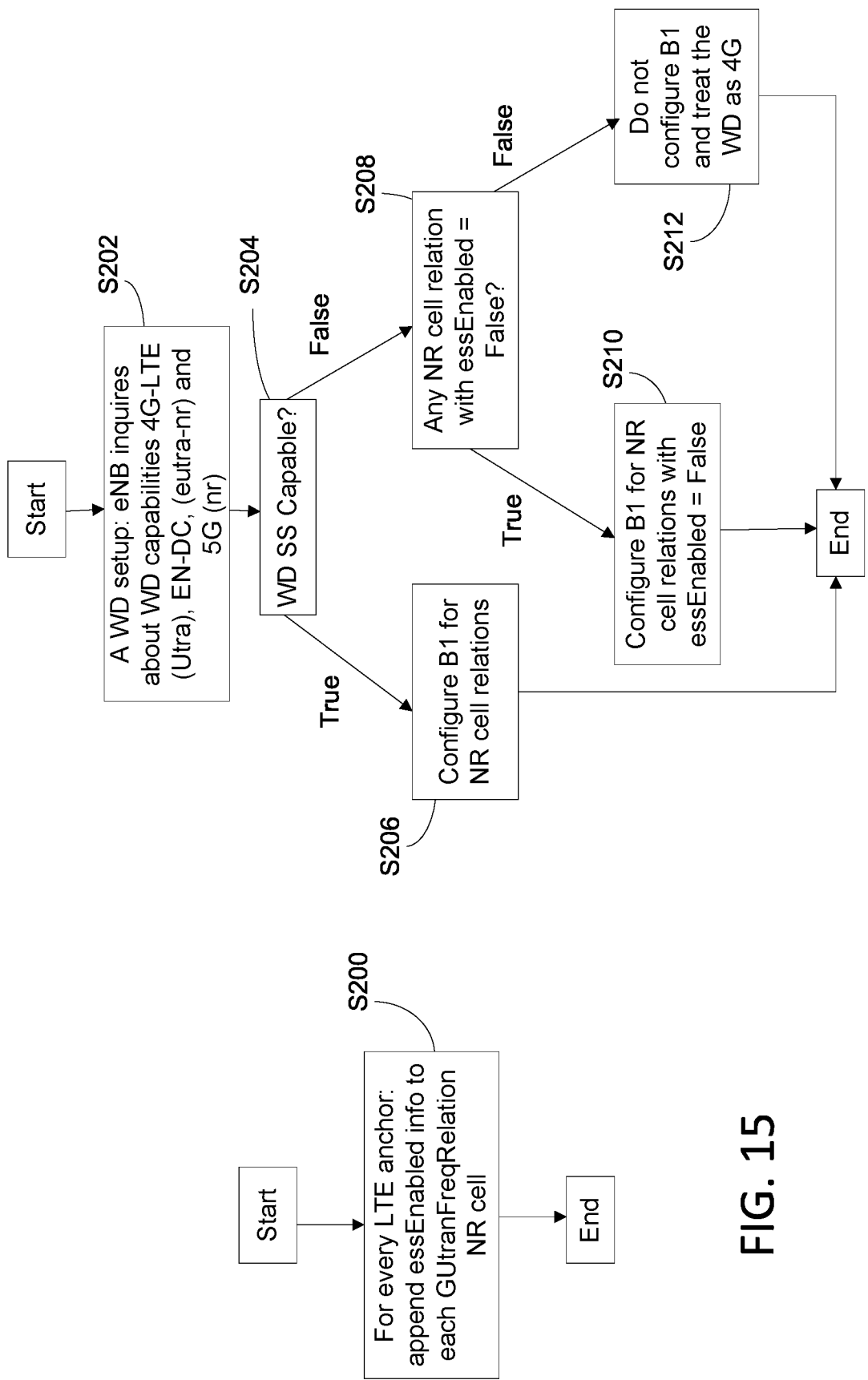

HANDLING INCOMPATIBLE WIRELESS DEVICES

CROSS-REFERENCE TO RELATED APPLICATIONS

This application is a Submission Under 35 U.S.C. § 371 for U.S. National Stage Patent Application of International Application No.: PCT/EP2021/056001, filed Mar. 10, 2021 entitled "HANDLING INCOMPATIBLE WIRELESS DEVICES," which claims priority to U.S. Provisional Application No. 62/987,536, filed Mar. 10, 2020, entitled "HANDLING INCOMPATIBLE UE IN NSA-ESS," the entireties of both of which are incorporated herein by reference.

FIELD

The present disclosure relates to wireless communications, and in particular, to handling incompatible wireless devices.

BACKGROUND

Spectrum Sharing

Third Generation Partnership Project (3GPP) Fifth Generation (5G) based communications (5G is also called New Radio (NR)) will be introduced on both new and legacy spectrum bands. This requires functionality that enables operators to plan their evolution of network assets including both spectrum bands and technologies, as well as, allow for a seamless roll-out of 5G with optimal end-user performance. Spectrum sharing, such as, for example, Ericsson Spectrum Sharing (ESS) may provide the possibility to intelligently, flexibly and quickly introduce and add 5G within existing 4G carriers, e.g., introduce 5G on low/mid frequency bands for wide area coverage and outside in coverage. ESS software dynamically shares spectrum between 4G and 5G carriers based on traffic demand. The switch between carriers may occur within milliseconds (ms), which may minimize spectrum waste and allow for good end-user performance.

SUMMARY

Some embodiments advantageously provide methods, systems, and apparatuses for handling incompatible wireless devices in a particular spectrum sharing arrangement, e.g., non-standalone (NSA).

In one embodiment, a method implemented in a network node operating at least one first cell of a first radio access technology (RAT) includes optionally, receiving information about a spectrum sharing mode of at least one second cell of a second RAT, the spectrum sharing mode indicating whether the at least one second cell of the second RAT is enabled to share a frequency band with the at least one first cell of the first RAT; requesting WD capability information, the WD capability information indicating whether the WD is capable of at least one spectrum sharing capability; optionally, receiving the WD capability information from the WD; based at least part on the received WD capability information, determining whether the WD is one of spectrum sharing capable and spectrum sharing incapable; and optionally, based at least in part on the determined one of the spectrum sharing capable and spectrum sharing incapable and further based at least in part on the received information about the spectrum sharing mode of the at least one second cell of the second RAT, determining whether to configure the WD for a B1 measurement on the at least one second cell of the second RAT.

In one embodiment, a method implemented in a wireless device (WD) includes receiving a request for WD capability information; and as a result of the request, sending the WD capability information to the network node, the WD capability information indicating whether the WD is capable of at least one spectrum sharing capability.

In one embodiment, a method implemented in a network node includes sending information about a spectrum sharing mode of at least one second cell of a second radio access technology (RAT), the spectrum sharing mode indicating whether the at least one second cell of the second RAT is enabled to share a frequency band with the at least one first cell of a first RAT.

According to an aspect, a method implemented in a wireless device, WD, is provided. The method comprises receiving a request for a WD capability information; and as a result of the request, sending the WD capability information to the network node, the WD capability information indicating whether the WD is capable of at least one spectrum sharing capability.

In some embodiments of this aspect, the request for the WD capability information is received from an eNodeB prior to the WD being configured to perform a B1 measurement on at least one Third Generation Partnership Project, 3GPP, New Radio, NR, cell. In some embodiments of this aspect, the request for WD capability information and the received WD capability information is via radio resource control, RRC, connection setup messages to connect to a Third Generation Partnership Project, 3GPP, Long Term Evolution, LTE, Master eNodeB, MeB. In some embodiments of this aspect, the method further includes receiving a radio resource control, RRC, reconfiguration message to perform a B1 measurement on at least one cell, the at least one cell having a spectrum sharing mode that matches the WD capability information. In some embodiments of this aspect, the at least one spectrum sharing capability of the WD includes at least one of: a Long Term Evolution, LTE, cell-specific reference signal, CRS, rate matching capability; an additional demodulation reference signal, DMRS, position for LTE CRS co-existence with Third Generation Partnership Project, 3GPP, New Radio, NR, capability; and a general rate matching pattern to map around LTE synchronization signals and a physical broadcast channel, PBCH, capability.

In some embodiments of this aspect, the WD capability information indicating the at least one spectrum sharing capability of the WD includes at least one of radio resource control, RRC, parameters rateMatchingLTE-CRS, additionalDMRS-DL-Alt and rateMatchingResrcSetSemi-Static.

According to another aspect of the present disclosure, a method implemented in a network node operating at least one first cell of a first radio access technology, RAT. The method comprises obtaining a WD capability information, the WD capability information indicating whether the WD is capable of at least one spectrum sharing capability; based at least part on the WD capability information, determining whether the WD is one of spectrum sharing capable and spectrum sharing incapable; optionally, receiving information about a spectrum sharing mode of at least one second cell of a second RAT, the spectrum sharing mode indicating whether the at least one second cell of the second RAT is enabled to share a frequency band with the at least one first cell of the first RAT; and optionally, based at least in part on the determined one of the spectrum sharing capable and spectrum sharing incapable and further based at least in part on the received information about the spectrum sharing mode of the at least one second cell of the second RAT, determining whether to configure the WD for a B1 measurement on the at least one second cell of the second RAT.

In some embodiments of this aspect, the method further comprises receiving the WD capability information from at least one of the WD and a core network node. In some embodiments of this aspect, determining whether to configure the WD for the B1 measurement further comprises: if the WD is spectrum sharing incapable, configuring the WD for the B1 measurement only on cells of the at least one second cell of the second RAT that indicated the spectrum sharing mode as not enabled for a spectrum sharing; and/or if the WD is spectrum sharing capable and the at least one second cell of the second RAT has the spectrum sharing mode as enabled for the spectrum sharing, configuring the WD for the B1 measurement on the at least one second cell of the second RAT.

In some embodiments of this aspect, one or more of: the first RAT is a Third Generation Partnership Project, 3GPP, Long Term Evolution, LTE RAT and the second RAT is a 3GPP New Radio, NR, RAT; and the network node is an LTE Master eNodeB, MeNB and a network node supporting the at least one second cell of the second RAT is a NR Secondary gNodeB, SgNB. In some embodiments of this aspect, the at least one spectrum sharing capability of the WD includes at least one of a Long Term Evolution, LTE, cell-specific reference signal, CRS, rate matching capability, an additional demodulation reference signal, DMRS, position for LTE CRS co-existence with Third Generation Partnership Project, 3GPP, New Radio, NR, capability and a general rate matching pattern to map around LTE synchronization signals and a physical broadcast channel, PBCH, capability.

In some embodiments of this aspect, the WD capability information indicating the at least one spectrum sharing capability of the WD includes at least one of radio resource control, RRC, parameters rateMatchingLTE-CRS, additionalDMRS-DL-Alt and rateMatchingResrcSetSemi-Static. In some embodiments of this aspect, the request for WD capability information and the received WD capability information is via radio resource control, RRC, connection setup messages. In some embodiments of this aspect, receiving information about the spectrum sharing mode of the at least one second cell of the second RAT is via a dual connectivity, DC, X2 setup response message.

According to yet another aspect, a method implemented in a network node operating at least one second cell of a second radio access technology, RAT, is provided. The method comprises sending information about a spectrum sharing mode of the at least one second cell of the second RAT, the spectrum sharing mode indicating whether the at least one second cell of the second RAT is enabled to share a frequency band with the at least one first cell of a first RAT.

In some embodiments of this aspect, one or more of: the first RAT is a Third Generation Partnership Project, 3GPP, Long Term Evolution, LTE RAT and the second RAT is a 3GPP New Radio, NR, RAT; and a network node operating the at least one first cell of the first RAT is an LTE Master eNodeB, MeNB, and the network node operating the at least one second cell of the second RAT is a NR Secondary gNodeB, SgNB. In some embodiments of this aspect, the information about the spectrum sharing mode of the at least one second cell of the second RAT is sent via a dual connectivity, DC, X2 setup response message.

According to another aspect of the present disclosure, a wireless device, WD, configured to communicate with a network node is provided. The WD comprises processing circuitry. The processing circuitry is configured to cause the WD to receive a request for a WD capability information; and as a result of the request, send the WD capability information to the network node, the WD capability information indicating whether the WD is capable of at least one spectrum sharing capability.

In some embodiments of this aspect, the request for the WD capability information is received from an eNodeB prior to the WD being configured to perform a B1 measurement on at least one Third Generation Partnership Project, 3GPP, New Radio, NR, cell. In some embodiments of this aspect, the request for WD capability information and the received WD capability information is via radio resource control, RRC, connection setup messages to connect to a Third Generation Partnership Project, 3GPP, Long Term Evolution, LTE, Master eNodeB, MeB. In some embodiments of this aspect, the method further comprises receiving a radio resource control, RRC, reconfiguration message to perform a B1 measurement on at least one cell, the at least one cell having a spectrum sharing mode that matches the WD capability information.

In some embodiments of this aspect, the at least one spectrum sharing capability of the WD includes at least one of: a Long Term Evolution, LTE, cell-specific reference signal, CRS, rate matching capability; an additional demodulation reference signal, DMRS, position for LTE CRS co-existence with Third Generation Partnership Project, 3GPP, New Radio, NR, capability; and a general rate matching pattern to map around LTE synchronization signals and a physical broadcast channel, PBCH, capability.

In some embodiments of this aspect, the WD capability information indicating the at least one spectrum sharing capability of the WD includes at least one of radio resource control, RRC, parameters rateMatchingLTE-CRS, additionalDMRS-DL-Alt and rateMatchingResrcSetSemi-Static.

According to another aspect of the present disclosure, a network node configured to communicate with a wireless device, WD, is provided. The network node comprises processing circuitry. The processing circuitry is configured to cause the network node to obtain a WD capability information, the WD capability information indicating whether the WD is capable of at least one spectrum sharing capability; based at least part on the WD capability information, determine whether the WD is one of spectrum sharing capable and spectrum sharing incapable; optionally, receive information about a spectrum sharing mode of at least one second cell of a second RAT, the spectrum sharing mode indicating whether the at least one second cell of the second RAT is enabled to share a frequency band with the at least one first cell of the first RAT; and optionally, based at least in part on the determined one of the spectrum sharing capable and spectrum sharing incapable and further based at least in part on the received information about the spectrum sharing mode of the at least one second cell of the second RAT, determine whether to configure the WD for a B1 measurement on the at least one second cell of the second RAT.

In some embodiments of this aspect, the method further includes receiving the WD capability information from at least one of the WD and a core network node. In some embodiments of this aspect, determining whether to configure the WD for the B1 measurement further comprises: if the WD is spectrum sharing incapable, configuring the WD for the B1 measurement only on cells of the at least one second cell of the second RAT that indicated the spectrum sharing mode as not enabled for a spectrum sharing; and/or if the WD is spectrum sharing capable and the at least one second cell of the second RAT has the spectrum sharing mode as enabled for the spectrum sharing, configuring the WD for the B1 measurement on the at least one second cell of the second RAT.

In some embodiments of this aspect, one or more of: the first RAT is a Third Generation Partnership Project, 3GPP, Long Term Evolution, LTE RAT and the second RAT is a 3GPP New Radio, NR, RAT; and the network node is an LTE Master eNodeB, MeNB and a network node supporting the at least one second cell of the second RAT is a NR Secondary gNodeB, SgNB. In some embodiments of this aspect, the at least one spectrum sharing capability of the WD includes at least one of a Long Term Evolution, LTE, cell-specific reference signal, CRS, rate matching capability, an additional demodulation reference signal, DMRS, position for LTE CRS co-existence with Third Generation Partnership Project, 3GPP, New Radio, NR, capability and a general rate matching pattern to map around LTE synchronization signals and a physical broadcast channel, PBCH, capability.

In some embodiments of this aspect, the WD capability information indicating the at least one spectrum sharing capability of the WD includes at least one of radio resource control, RRC, parameters rateMatchingLTE-CRS, additionalDMRS-DL-Alt and rateMatchingResrcSetSemi-Static. In some embodiments of this aspect, the request for WD capability information and the received WD capability information is via radio resource control, RRC, connection setup messages. In some embodiments of this aspect, receiving information about the spectrum sharing mode of the at least one second cell of the second RAT is via a dual connectivity, DC, X2 setup response message.

According to another aspect, a network node operating at least one second cell of a second radio access technology, RAT, is provided. The network node comprises processing circuitry. The processing circuitry is configured to cause the network node to send information about a spectrum sharing mode of the at least one second cell of the second RAT, the spectrum sharing mode indicating whether the at least one second cell of the second RAT is enabled to share a frequency band with the at least one first cell of a first RAT.

In some embodiments of this aspect, one or more of: the first RAT is a Third Generation Partnership Project, 3GPP, Long Term Evolution, LTE RAT and the second RAT is a 3GPP New Radio, NR, RAT; and a network node operating the at least one first cell of the first RAT is an LTE Master eNodeB, MeNB, and the network node operating the at least one second cell of the second RAT is a NR Secondary gNodeB, SgNB. In some embodiments of this aspect, the information about the spectrum sharing mode of the at least one second cell of the second RAT is sent via a dual connectivity, DC, X2 setup response message.

According to yet another aspect, one or more apparatuses comprising computer program instructions executable by at least one processor to perform any one or more of the methods above is provided.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 15 is a flowchart of an example process for a network node to append spectrum sharing information to NR cell information according to some embodiments of the present disclosure;

FIG. 16 is a flowchart of an example process for a network node to obtain WD capability information related to spectrum sharing according to some embodiments of the present disclosure.

DETAILED DESCRIPTION

WD Capabilities for Spectrum Sharing

Figure 1:
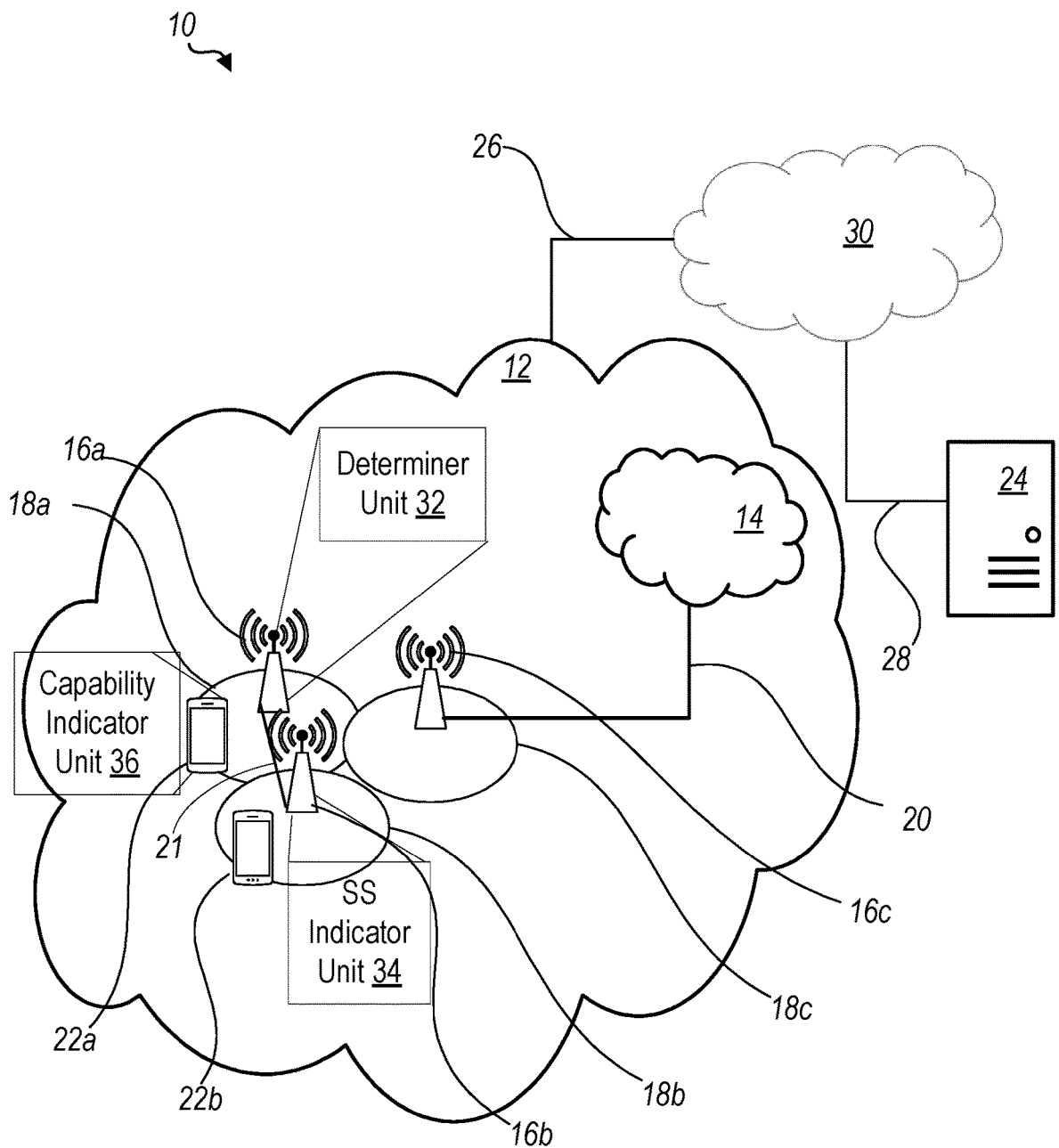
FIG. 1 is a schematic diagram of an exemplary network architecture illustrating a communication system connected via an intermediate network to a host computer according to the principles in the present disclosure.

As an initial matter, while the particular spectrum sharing embodiment discussed herein is ESS, it is understood that embodiments other than ESS may be applicable. Thus, the disclosure herein refers more generally to the use of a "particular", e.g., predetermined, specified, etc., spectrum sharing arrangement. In some embodiments, the spectrum sharing discussed herein, e.g., ESS, may use 3GPP Release 15.4 wireless device (WD) capabilities to avoid collision of 3GPP Long Term Evolution (LTE) physical signals and NR Resource Elements (RE). These WD capabilities related to spectrum sharing include:

1. LTE cell-specific reference signal (CRS) rate matching (e.g., NR being aware of and/or mapping around LTE signals);
2. Alternative additional demodulation reference signal (DMRS) location; and
3. General rate matching pattern to map around LTE synchronization and physical broadcast channel (PBCH) signals, as shown in the table below.

TABLE 1

| | | |
|---|---|---|
| BandNR | rateMatchingLTE-CRS | Indicates whether the WD supports receiving physical downlink shared channel (PDSCH) with resource mapping that excludes the REs determined by the higher layer configuration LTE-carrier configuring common reference signal (RS), as specified in 3GPP Technical Specification (TS) 38.214. |
| FeatureSetDownlink-v1540 | additionalDMRS-DL-Alt | Indicates whether the WD supports the alternative additional DMRS position for co-existence with LTE CRS. It is applied to 15 kHz subcarrier spacing (SCS) and one additional DMRS case only. |
| Phy-ParametersCommon | rateMatchingResrcSetSemi-Static | Indicates whether the WD supports receiving PDSCH with resource mapping that excludes the REs corresponding to resource sets configured with resource block (RB)-symbol level granularity following the semi-static configuration as specified in TS 38.214. |

However, these capabilities may not be supported by WDs earlier than 3GPP Release 15.4. If a network supports a particular spectrum sharing, e.g., ESS, and the WD does not support this spectrum sharing, e.g., ESS, then there may be ambiguity in handling of such a device.

An existing solution checks the multi-radio access technology dual connectivity (MR-DC) band combinations to configure B1 measurements (e.g., measurement of a neighbor cell for determining whether neighbor cell can be added for DC purposes) for Evolved Universal Terrestrial Radio Access (EUTRA)-NR Dual Connectivity (EN-DC), also known as non-standalone (NSA). A problem with this solution is that it does not consider whether or not an NR cell for which B1 measurement is configured is in the particular spectrum sharing mode, e.g., ESS mode.

An alternate solution can be to check the WD capabilities at a network node, e.g., gNB, (next generation NodeB/5G base station) of an EN-DC capable WD. One problem with this solution is that if the gNB rejects the WD for a (secondary network node, e.g., secondary gNB) SGNB ADDITION REQUEST (which may be a request message in the EN-DC procedures to add the secondary network node, e.g., gNB to, e.g., a master network node, e.g., eNB) based on the above capabilities, the WD may continue with B1 measurements.

This may result in repetitions of the measurement report from the WD, which could be in the order of 0.5-1 seconds (sec). The WD may attempt on the same NR-ESS cell again and will be rejected again. This may have serious degradation on the WD throughput and battery and create unnecessary radio resource control (RRC) and X2 signaling in certain scenarios, such as, for example:

a first network node, e.g., eNB, is connected to Band1 LTE cell;
a second network node, e.g., gNB, is connected to n71 NR cell;
n71 NR cell is in the particular mode, e.g., ESS mode; and
WD supports n71, but is not capable of operating in the particular mode, e.g., the WD is not ESS capable.

In the above scenario, the following problem may occur.

Step 1: the first network node, e.g., eNB, requests B1 measurements from the WD.

Step 2: WD reports n71 channel via measurement report.

Step 3: the first network node, e.g., eNB, requests SGNB Addition via X2.

Step 4: the second network node, e.g., gNB, will perform a capability check of the 3 particular modes, e.g., ESS, attributes described above and realize the WD is NOT capable of operating in this mode, e.g., ESS mode. Since this second network node, e.g., gNB, is connected to n71 (i.e., primary secondary cell (PSCell)), the X2 SGNB Addition will be rejected.

Step 5: WD will remain on the LTE anchor (LTE cell) without EN-DC and continue to report B1 measurements.

Some embodiments of the present disclosure propose a method to attempt to solve at least some of the above-mentioned problems faced by incompatible NR WDs. Some embodiments may include determining WD capabilities at the eNB (LTE base station) and match the determined WD capabilities with the appropriate NR carriers to allow or disallow EN-DC.

Some embodiments may advantageously provide for one or more of: increased WD throughput; lower battery consumption; and/or reduced X2 and RRC signaling, as compared to existing solutions.

Before describing in detail exemplary embodiments, it is noted that the embodiments reside primarily in combinations of apparatus components and processing steps related to handling incompatible wireless devices in a particular spectrum sharing arrangement, e.g., non-standalone (NSA) Ericsson Spectrum Sharing (ESS). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "spectrum sharing" may be intended to indicate at least two different RATs sharing a same carrier/band.

In some embodiments, having a spectrum sharing mode that "matches" WD capability information may be intended to indicate that a WD that is not enabled for spectrum sharing is not configured to perform measurements, e.g., B1, on a cell in which spectrum sharing is enabled. Stated another way, in some embodiments, a WD is configured to perform measurements only on cells having an enablement/non-enablement of spectrum sharing that matches or is compatible with the WD's own capability related to spectrum sharing.

The term "radio measurement" used herein may refer to any measurement performed on radio signals. Radio measurements can be absolute or relative. Radio measurement may be called as signal level which may be signal quality and/or signal strength. Radio measurements can be e.g., intra-frequency, inter-frequency, inter-RAT measurements, CA measurements, etc. Radio measurements can be unidirectional (e.g., DL or UL) or bidirectional (e.g., Round Trip Time (RTT), Receive-Transmit (Rx-Tx), etc.). Some examples of radio measurements: timing measurements (e.g., Time of Arrival (TOA), timing advance, RTT, Reference Signal Time Difference (RSTD), Rx-Tx, propagation delay, etc.), angle measurements (e.g., angle of arrival), power-based measurements (e.g., received signal power, Reference Signals Received Power (RSRP), received signal quality, Reference Signals Received Quality (RSRQ), Signal-to-interference-plus-noise Ratio (SINR), Signal Noise Ratio (SNR), interference power, total interference plus noise, Received Signal Strength Indicator (RSSI), noise power, etc.), cell detection or cell identification, radio link monitoring (RLM), system information (SI) reading, etc. The inter-frequency and inter-RAT measurements are carried out by the WD in measurement gaps unless the WD is capable of doing such measurement without gaps. Examples of measurement gaps are measurement gap id #0 (each gap of 6 ms occurring every 40 ms), measurement gap id #1 (each gap of 6 ms occurring every 80 ms), etc. The measurement gaps are configured at the WD by the network node.

In some embodiment, with rate matching, the resource elements that should be empty/used by another channel/signal (such as LTE channels/signals) are mapped around during the mapping operation. In other words, rate matching may mean that the transmitter (e.g., transmitter configured for NR) considers from the beginning that some resource elements are used for another signal (e.g., LTE signals) and does not put information from a signal/channel on those resource elements that are used by the other channel/signal.

An indication (e.g., an indication of spectrum sharing mode or capability, etc.) generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

Configuring a Radio Node

Configuring a radio node, in particular a terminal or user equipment or the WD, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., a configuration for transmitting and/or receiving on allocated resources, in particular frequency resources, or e.g., configuration for performing certain measurements on certain subframes or radio resources. A radio node may configure itself, e.g., based on configuration data received from a network or network node. A network node may use, and/or be adapted to use, its circuitry/ies for configuring. Allocation information may be considered a form of configuration data. Configuration data may comprise and/or be represented by configuration information, and/or one or more corresponding indications and/or message/s.

Configuring in General

Generally, configuring may include determining configuration data representing the configuration and providing, e.g., transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR.

A cell may be generally a communication cell, e.g., of a cellular or mobile communication network, provided by a node. A serving cell may be a cell on or via which a network node (the node providing or associated to the cell, e.g., base station or eNodeB) transmits and/or may transmit data (which may be data other than broadcast data) to a user equipment, in particular control and/or user or payload data, and/or via or on which a WD transmits and/or may transmit data to the node; a serving cell may be a cell for or on which the WD is configured and/or to which it is synchronized and/or has performed an access procedure, e.g., a random access procedure, and/or in relation to which it is in a RRC_connected or RRC_idle state, e.g., in case the node and/or user equipment and/or network follow the LTE and/or NR-standard. One or more carriers (e.g., uplink and/or downlink carrier/s and/or a carrier for both uplink and downlink) may be associated to a cell.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB or gNodeB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB or gNodeB, may be adapted to provide and/or define and/or control one or more cells.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for handling incompatible wireless devices in a particular spectrum sharing arrangement, e.g., non-standalone (NSA) Ericsson Spectrum Sharing (ESS).

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each of the coverage areas 18 may include one or more cells (e.g., NR cell and/or LTE anchor cell). Each network node 16a, 16b, 16c is connectable to the core network 14 over a wired or wireless connection 20. Network node 16a is shown connected to network node 16b over a connection 21 (e.g., X2 interface). A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN. In some embodiments, the dual connectivity may be over a same frequency band (e.g., mid and/or low-band) and thereby provide for spectrum sharing according to some embodiments of the present disclosure.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 (e.g., network node 16*a*) is configured to include a determiner unit 32 which is configured to one or more of:

optionally, receive information about a spectrum sharing mode of at least one second cell of a second RAT, the spectrum sharing mode indicating whether the at least one second cell of the second RAT is enabled to share a frequency band with the at least one first cell of the first RAT;

request WD capability information, the WD capability information indicating whether the WD is capable of at least one spectrum sharing capability;

optionally, receive the WD capability information from the WD;

based at least part on the received WD capability information, determine whether the WD is one of spectrum sharing capable and spectrum sharing incapable; and optionally, based at least in part on the determined one of the spectrum sharing capable and spectrum sharing incapable and further based at least in part on the received information about the spectrum sharing mode of the at least one second cell of the second RAT, determine whether to configure the WD for a B1 measurement on the at least one second cell of the second RAT.

A network node 16 (e.g., network node 16*b*) is configured to include a spectrum sharing (SS) indicator unit 34 which is configured to send information about a spectrum sharing mode of at least one second cell of a second radio access technology (RAT), the spectrum sharing mode indicating whether the at least one second cell of the second RAT is enabled to share a frequency band with the at least one first cell of a first RAT.

A WD 22 is configured to include a capability indicator unit 36 which is configured to receive a request for WD capability information; and as a result of the request, send the WD capability information to the network node 16, the WD capability information indicating whether the WD 22 is capable of at least one spectrum sharing capability.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and/or the wireless device 22. The processing circuitry 42 of the host computer 24 may include a monitor unit 54 configured to enable the service provider to observe, monitor, control, transmit to and/or receive from the network node 16 and/or the wireless device 22.

The communication system 10 further includes a network node 16 (e.g., network node 16a, network node 16b) provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10. In some embodiments, communication interface 60 may be configured to implement connection 21 (e.g., X2 interface).

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

For example, processing circuitry 68 of the network node 16 may include determiner unit 32 (as shown for network node 16a) configured to perform network node methods discussed herein, such as the methods discussed with reference to FIG. 7 and FIG. 10 as well as other figures.

In some embodiments, processing circuitry 68 of the network node 16 may include SS indicator unit 34 (as shown for network node 16b) configured to perform network node methods discussed herein, such as the methods discussed with reference to FIG. 9 and FIG. 12 as well as other figures. Generally, the SW 74 and/or HW 58 components (e.g., communication interface 60, radio interface 62, processing circuitry 68, memory 72 and processor 70) shown in network node 16a may also be included in network node 16b, but are not shown in FIG. 2 for the sake of brevity. Further, although determiner unit 32 is shown in network node 16a and SS indicator unit 34 is shown in network node 16b, in some embodiments, there may be a network node 16 that includes both units 32 and 34.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a capability indicator unit 36 configured to perform WD methods discussed herein, such as the methods discussed with reference to FIG. 8 and FIG. 11 as well as other figures.

Figure 2:
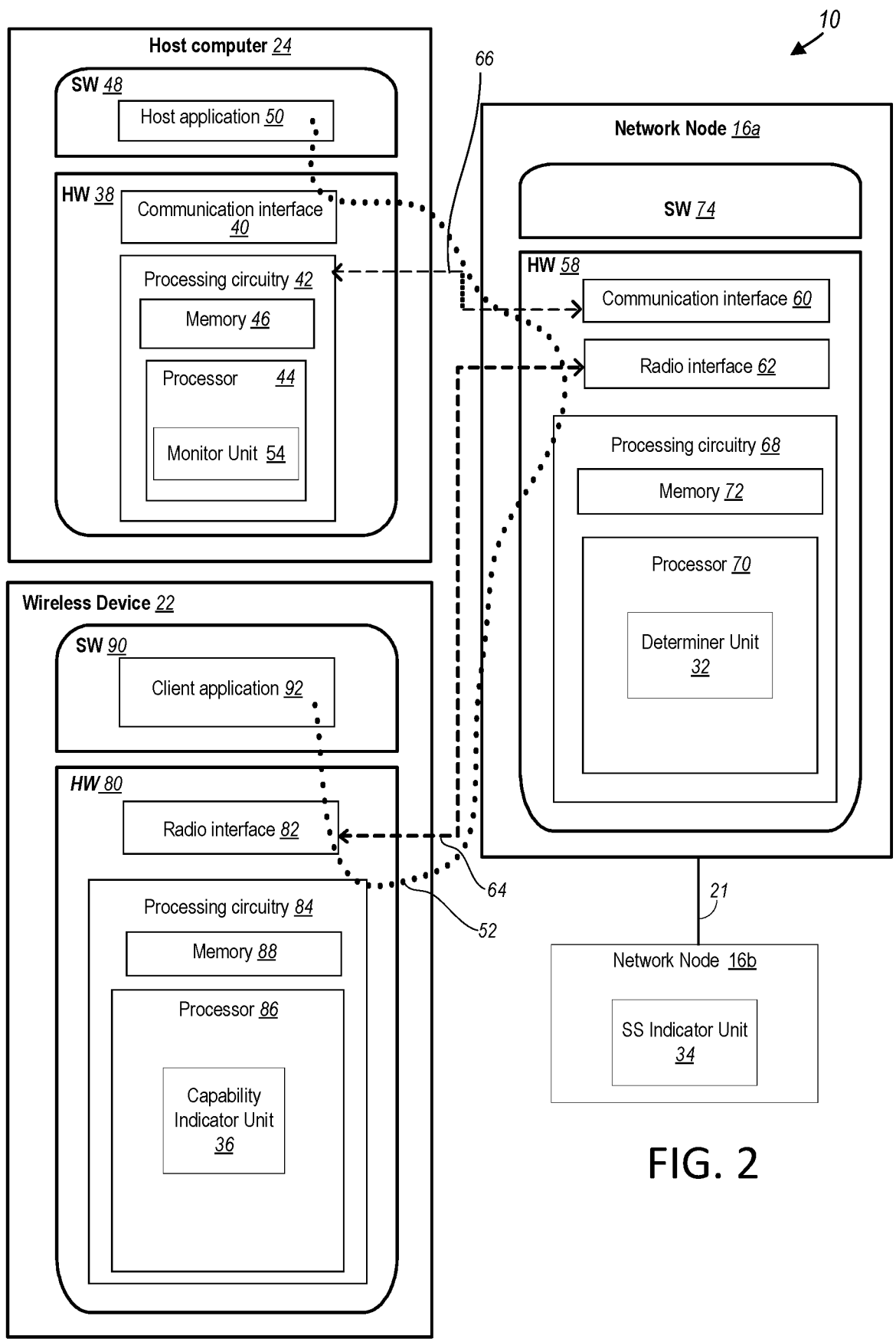
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as determiner unit 32, and SS indicator unit 34 and capability indicator unit 36 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
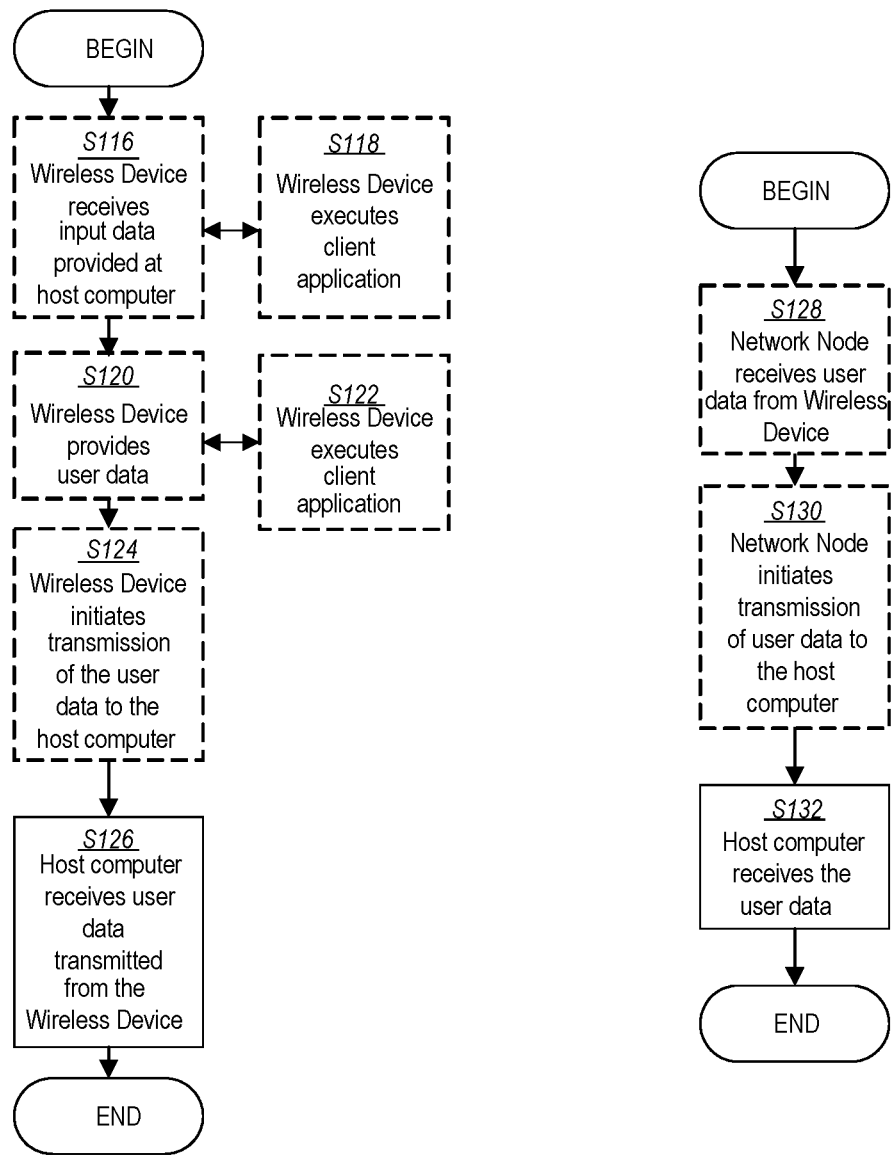
FIG. 5 is a flowchart illustrating exemplary methods implemented in a communication system including a host computer, a network node and a wireless device for receiving user data from the wireless device at a host computer according to some embodiments of the present disclosure.
FIG. 6 is a flowchart illustrating exemplary methods implemented in a communication system including a host computer, a network node and a wireless device for receiving user data at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
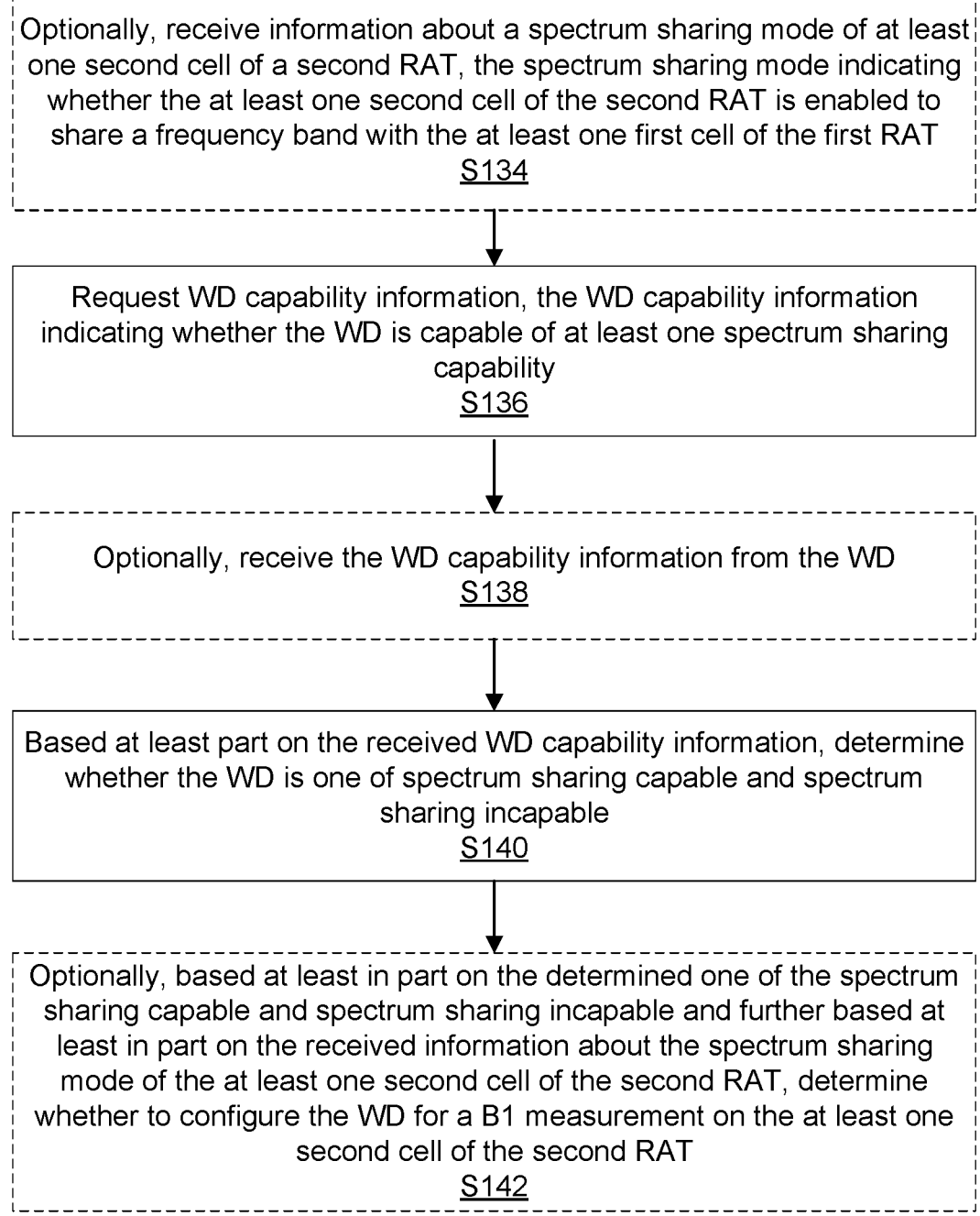
FIG. 7 is a flowchart of an exemplary process in a network node for determiner unit according to some embodiments of the present disclosure.

FIG. 7 is a flowchart of an exemplary process in a network node 16 (e.g., network node 16a) for handling incompatibility according to some embodiments of the present disclosure. One or more Blocks and/or functions and/or methods performed by the network node 16 may be performed by one or more elements of network node 16 such as by determiner unit 32 in processing circuitry 68, processor 70, communication interface 60, radio interface 62, etc. according to the example method. The example method includes optionally, receiving (Block S134), such as via determiner unit 32, processing circuitry 68, processor 70, communication interface 60 and/or radio interface 62, information about a spectrum sharing mode of at least one second cell of a second RAT, the spectrum sharing mode indicating whether the at least one second cell of the second RAT is enabled to share a frequency band with the at least one first cell of the first RAT. The method includes requesting (Block S136), such as via determiner unit 32, processing circuitry 68, processor 70, communication interface 60 and/or radio interface 62, WD capability information, the WD capability information indicating whether the WD is capable of at least one spectrum sharing capability. The method includes optionally, receiving (Block S138), such as via determiner unit 32, processing circuitry 68, processor 70, communication interface 60 and/or radio interface 62, the WD capability information from the WD 22. The method includes, based at least part on the received WD capability information, determining (Block S140), such as via determiner unit 32, processing circuitry 68, processor 70, communication interface 60 and/or radio interface 62, whether the WD 22 is one of spectrum sharing capable and spectrum sharing incapable. The method includes optionally, based at least in part on the determined one of the spectrum sharing capable and spectrum sharing incapable and further based at least in part on the received information about the spectrum sharing mode of the at least one second cell of the second RAT, determining (Block S142), such as via determiner unit 32, processing circuitry 68, processor 70, communication interface 60 and/or radio interface 62, whether to configure the WD 22 for a B1 measurement on the at least one second cell of the second RAT.

In some embodiments, determining whether to configure the WD 22 for the B1 measurement further includes: if the WD 22 is spectrum sharing incapable, configuring, such as via determiner unit 32, processing circuitry 68, processor 70, communication interface 60 and/or radio interface 62, the WD 22 for the B1 measurement only on cells of the at least one second cell of the second RAT that indicated the spectrum sharing mode as not enabled for spectrum sharing; and/or if the WD 22 is spectrum sharing capable and the at least one cell of the second RAT has the spectrum sharing mode as enabled for spectrum sharing, configuring, such as via determiner unit 32, processing circuitry 68, processor 70, communication interface 60 and/or radio interface 62, the WD 22 for the B1 measurement on the at least one second cell of the second RAT.

In some embodiments, the information about the spectrum sharing mode indicates an Ericsson Spectrum Sharing (ESS) mode of the at least one second cell of the second RAT. In some embodiments, the first RAT is different from the second RAT. In some embodiments, the first RAT is Third Generation Partnership Project (3GPP) Long Term Evolution (LTE). In some embodiments, the second RAT is 3GPP New Radio (NR). In some embodiments, the network node 16 is an LTE Master eNodeB (MeNB). In some embodiments, a network node for the at least one second cell of the second RAT is a NR Secondary gNodeB (SgNB).

In some embodiments, the at least one spectrum sharing capability of the WD 22 includes at least one of LTE cell-specific reference signal (CRS) rate matching capability, additional demodulation reference signal (DMRS) position for LTE CRS co-existence with NR capability, and general rate matching pattern to map around LTE synchronization signals and physical broadcast channel (PBCH) capability. In some embodiments, the WD capability information indicating the at least one spectrum sharing capability of the WD includes at least one of radio resource control (RRC) parameters rateMatchingLTE-CRS, additionalDMRS-DL-Alt and rateMatchingResrcSetSemi-Static. In some embodiments, the request for WD capability information and the received WD capability information is via RRC connection setup messages. In some embodiments, the receiving information, such as via determiner unit 32, processing circuitry 68, processor 70, communication interface 60 and/or radio interface 62, about the spectrum sharing mode of the at least one second cell of the second RAT is via a dual connectivity X2 setup response message.

Figure 8:
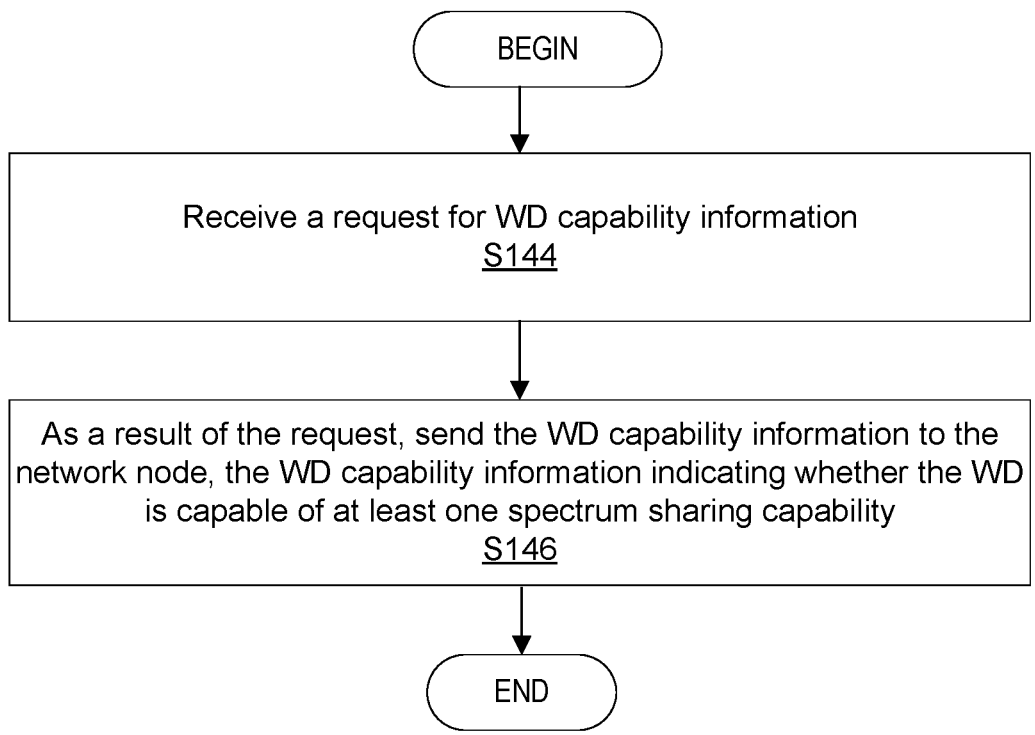
FIG. 8 is a flowchart of an exemplary process in a wireless device for capability indicator unit according to some embodiments of the present disclosure.

FIG. 8 is a flowchart of an exemplary process in a wireless device 22 for handling incompatibility according to some embodiments of the present disclosure. One or more Blocks and/or functions and/or methods performed by WD 22 may be performed by one or more elements of WD 22 such as by capability indicator unit 36 in processing circuitry 84, processor 86, radio interface 82, etc. The example method includes receiving (Block S144), such as via capability indicator unit 36, processing circuitry 84, processor 86 and/or radio interface 82, a request for WD capability information. The method includes, as a result of the request, sending (Block S146), such as via capability indicator unit 36, processing circuitry 84, processor 86 and/or radio interface 82, the WD capability information to the network node 16, the WD capability information indicating whether the WD 22 is capable of at least one spectrum sharing capability.

In some embodiments, the request for WD capability information and the received WD capability information is via RRC connection setup messages to connect to a Third Generation Partnership Project (3GPP) Long Term Evolution (LTE) Master eNodeB (MeB). In some embodiments, the method further includes receiving a radio resource control (RRC) reconfiguration message to perform a B1 measurement on at least one cell, the at least one cell having a spectrum sharing mode that matches the WD capability information. In some embodiments, the at least one spectrum sharing capability of the WD includes at least one of LTE cell-specific reference signal (CRS) rate matching capability, additional demodulation reference signal (DMRS) position for LTE CRS co-existence with NR capability, and general rate matching pattern to map around LTE synchronization signals and physical broadcast channel (PBCH) capability. In some embodiments, the WD capability information indicating the at least one spectrum sharing capability of the WD 22 includes at least one of radio resource control (RRC) parameters rateMatchingLTE-CRS, additionalDMRS-DL-Alt and rateMatchingResrcSetSemi-Static.

Figure 9:
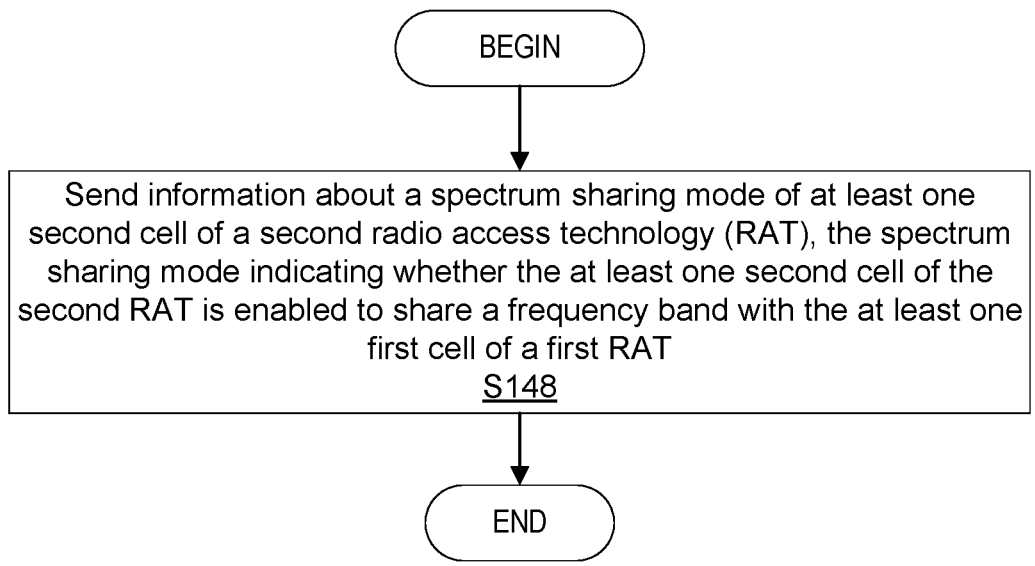
FIG. 9 is a flowchart of an exemplary process in a network node for spectrum sharing indicator unit according to some embodiments of the present disclosure.

FIG. 9 is a flowchart of an exemplary process in a network node 16 (e.g., network node 16b) for handling incompatibility according to some embodiments of the present disclosure. One or more Blocks and/or functions and/or methods performed by the network node 16 may be performed by one or more elements of network node 16 such as by SS indicator unit 34 in processing circuitry 68, processor 70, communication interface 60, radio interface 62, etc. according to the example method. The example method includes sending (Block S148), such as via SS indicator unit 34, processing circuitry 68, processor 70, communication interface 60 and/or radio interface 62, information about a spectrum sharing mode of at least one second cell of a second radio access technology (RAT), the spectrum sharing mode indicating whether the at least one second cell of the second RAT is enabled to share a frequency band with the at least one first cell of a first RAT.

In some embodiments, the information about the spectrum sharing mode indicates an Ericsson Spectrum Sharing (ESS) mode of the at least one second cell of the second RAT. In some embodiments, the first RAT is different from the second RAT. In some embodiments, the first RAT is Third Generation Partnership Project (3GPP) Long Term Evolution (LTE). In some embodiments, the second RAT is 3GPP New Radio (NR). In some embodiments, the network node is a NR Secondary gNodeB (SgNB). In some embodiments, a network node for the at least one first cell of the first RAT is an LTE Master eNodeB (MeNB). In some embodiments, the information about the spectrum sharing mode of the at least one second cell of the second RAT is sent, such as via SS indicator unit 34, processing circuitry 68, processor 70, communication interface 60 and/or radio interface 62, via a dual connectivity X2 setup response message.

Figure 10:
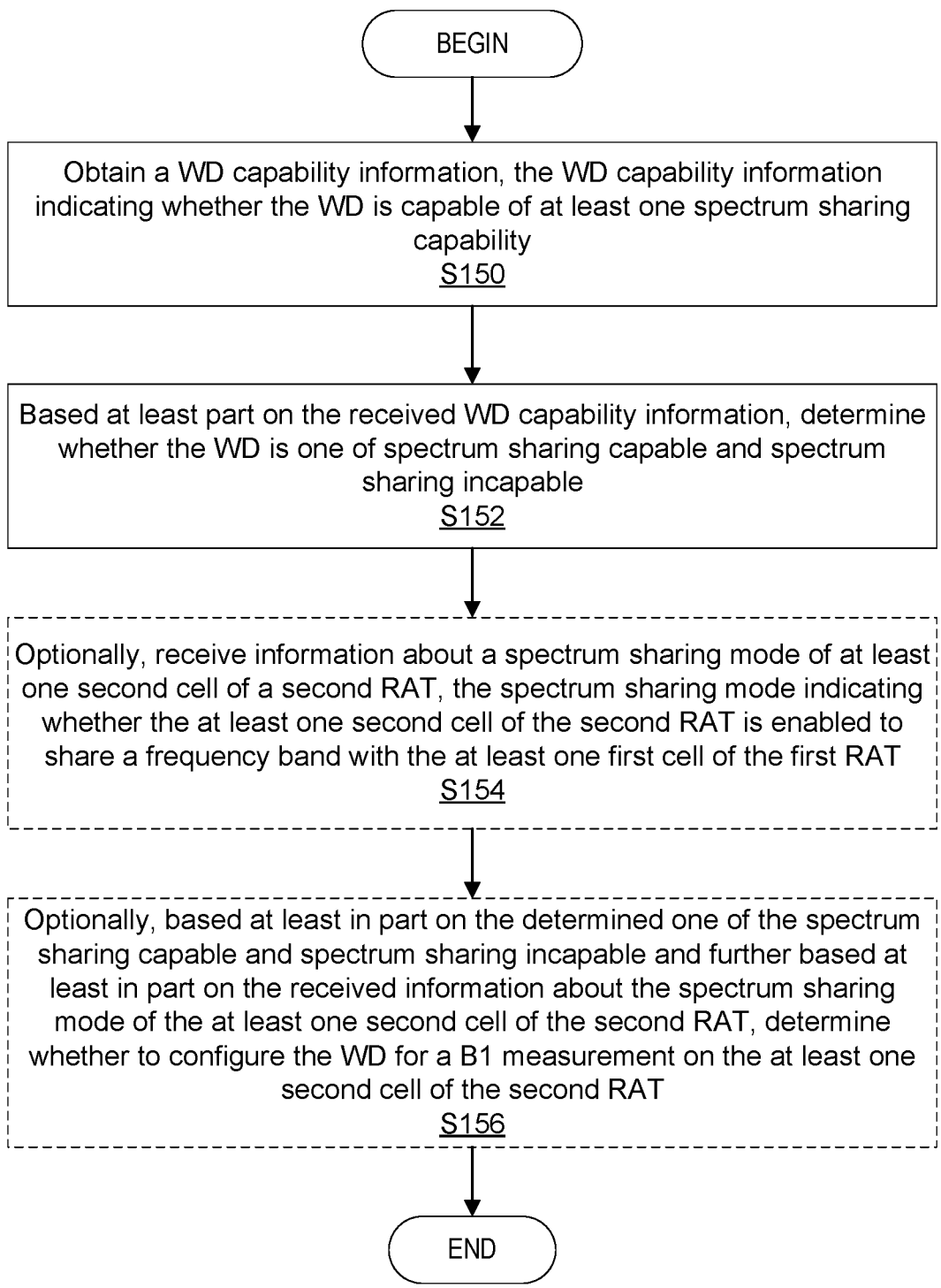
FIG. 10 is a flowchart of an exemplary process in a network node for determiner unit according to some embodiments of the present disclosure.

FIG. 10 is a flowchart of an exemplary process in a network node 16 (e.g., network node 16a, anchor-LTE/MeNB) for handling incompatibility according to some embodiments of the present disclosure. One or more Blocks and/or functions and/or methods performed by the network node 16 may be performed by one or more elements of network node 16 such as by determiner unit 32 in processing circuitry 68, processor 70, communication interface 60, radio interface 62, etc. according to the example method. The example method includes obtaining (Block S150), such as by determiner unit 32, processing circuitry 68, processor 70, communication interface 60 and/or radio interface 62, a WD capability information, the WD capability information indicating whether the WD is capable of at least one spectrum sharing capability. The method includes based at least part on the WD capability information, determining (Block S152), such as by determiner unit 32, processing circuitry 68, processor 70, communication interface 60 and/or radio interface 62, whether the WD is one of spectrum sharing capable and spectrum sharing incapable. The method includes optionally, receiving (Block S154), such as by determiner unit 32, processing circuitry 68, processor 70, communication interface 60 and/or radio interface 62, information about a spectrum sharing mode of at least one second cell of a second RAT, the spectrum sharing mode indicating whether the at least one second cell of the second RAT is enabled to share a frequency band with the at least one first cell of the first RAT. The method includes optionally, based at least in part on the determined one of the spectrum sharing capable and spectrum sharing incapable and further based at least in part on the received information about the spectrum sharing mode of the at least one second cell of the second RAT, determining (Block S156), such as by determiner unit 32, processing circuitry 68, processor 70, communication interface 60 and/or radio interface 62, whether to configure the WD for a B1 measurement on the at least one second cell of the second RAT.

In some embodiments, the method further includes receiving, such as by determiner unit 32, processing circuitry 68, processor 70, communication interface 60 and/or radio interface 62, the WD capability information from at least one of the WD and a core network node. In some embodiments, determining whether to configure the WD for the B1 measurement further comprises: if the WD is spectrum sharing incapable, configuring, such as by determiner unit 32, processing circuitry 68, processor 70, communication interface 60 and/or radio interface 62, the WD for the B1 measurement only on cells of the at least one second cell of the second RAT that indicated the spectrum sharing mode as not enabled for a spectrum sharing; and/or if the WD is spectrum sharing capable and the at least one second cell of the second RAT has the spectrum sharing mode as enabled for the spectrum sharing, configuring, such as by determiner unit 32, processing circuitry 68, processor 70, communication interface 60 and/or radio interface 62, the WD for the B1 measurement on the at least one second cell of the second RAT.

In some embodiments, one or more of: the first RAT is a Third Generation Partnership Project, 3GPP, Long Term Evolution, LTE RAT and the second RAT is a 3GPP New Radio, NR, RAT; and the network node is an LTE Master eNodeB, MeNB and a network node supporting the at least one second cell of the second RAT is a NR Secondary gNodeB, SgNB. In some embodiments, the at least one spectrum sharing capability of the WD includes at least one of a Long Term Evolution, LTE, cell-specific reference signal, CRS, rate matching capability, an additional demodulation reference signal, DMRS, position for LTE CRS co-existence with Third Generation Partnership Project, 3GPP, New Radio, NR, capability and a general rate matching pattern to map around LTE synchronization signals and a physical broadcast channel, PBCH, capability. In some embodiments, the WD capability information indicating the at least one spectrum sharing capability of the WD includes at least one of radio resource control, RRC, parameters rateMatchingLTE-CRS, additionalDMRS-DL-Alt and rateMatchingResrcSetSemi-Static.

In some embodiments, the request for WD capability information and the received WD capability information is via radio resource control, RRC, connection setup messages. In some embodiments, receiving information about the spectrum sharing mode of the at least one second cell of the second RAT is via a dual connectivity, DC, X2 setup response message.

Figure 11:
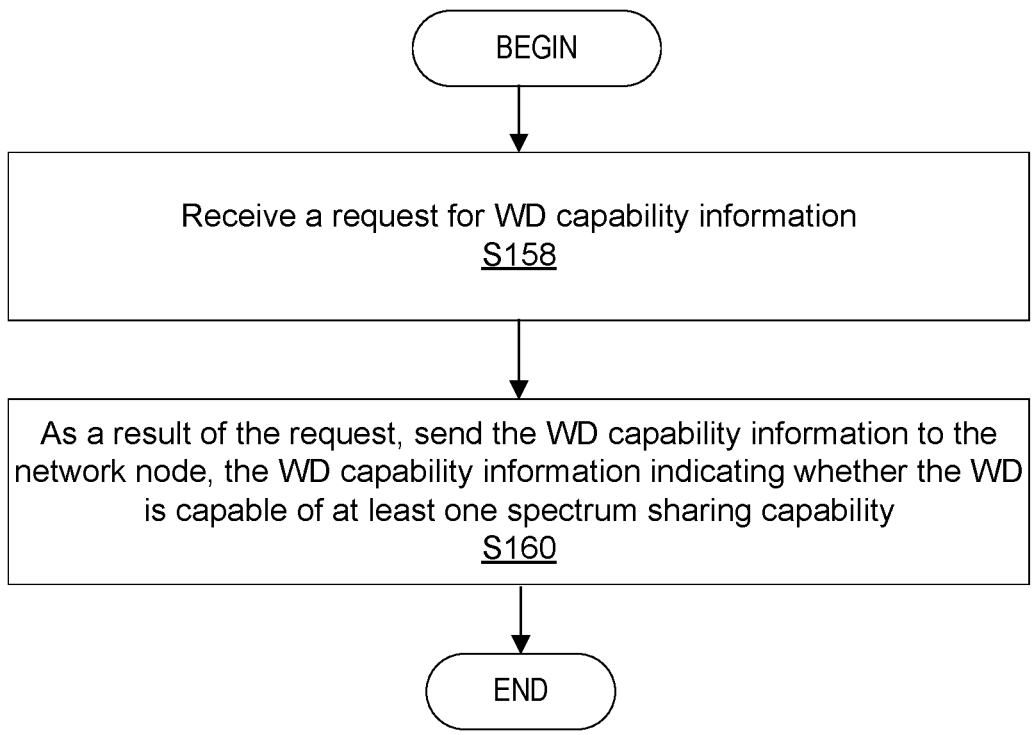
FIG. 11 is a flowchart of an exemplary process in a wireless device for capability indicator unit according to some embodiments of the present disclosure.

FIG. 11 is a flowchart of an exemplary process in a wireless device 22 for handling incompatibility according to some embodiments of the present disclosure. One or more Blocks and/or functions and/or methods performed by WD 22 may be performed by one or more elements of WD 22 such as by capability indicator unit 36 in processing circuitry 84, processor 86, radio interface 82, etc. The example method includes receiving (Block S158), such as by capability indicator unit 36 in processing circuitry 84, processor 86, radio interface 82, a request for a WD capability information. The method includes as a result of the request, sending (Block S160), such as by capability indicator unit 36 in processing circuitry 84, processor 86, radio interface 82, the WD capability information to the network node, the WD capability information indicating whether the WD is capable of at least one spectrum sharing capability.

In some embodiments, the request for the WD capability information is received, such as by capability indicator unit 36 in processing circuitry 84, processor 86, radio interface 82, from an eNodeB prior to the WD being configured to perform a B1 measurement on at least one Third Generation Partnership Project, 3GPP, New Radio, NR, cell. In some embodiments, the request for WD capability information and the received WD capability information is via radio resource control, RRC, connection setup messages to connect to a Third Generation Partnership Project, 3GPP, Long Term Evolution, LTE, Master eNodeB, MeB. In some embodiments, the method further includes receiving, such as by capability indicator unit 36 in processing circuitry 84, processor 86, radio interface 82, a radio resource control, RRC, reconfiguration message to perform a B1 measurement on at least one cell, the at least one cell having a spectrum sharing mode that matches the WD capability information.

In some embodiments, the at least one spectrum sharing capability of the WD includes at least one of: a Long Term Evolution, LTE, cell-specific reference signal, CRS, rate matching capability; an additional demodulation reference signal, DMRS, position for LTE CRS co-existence with Third Generation Partnership Project, 3GPP, New Radio, NR, capability; and a general rate matching pattern to map around LTE synchronization signals and a physical broadcast channel, PBCH, capability. In some embodiments, the WD capability information indicating the at least one spectrum sharing capability of the WD includes at least one of radio resource control, RRC, parameters rateMatchingLTE-CRS, additionalDMRS-DL-Alt and rateMatchingResrcSet-Semi-Static.

Figure 12:
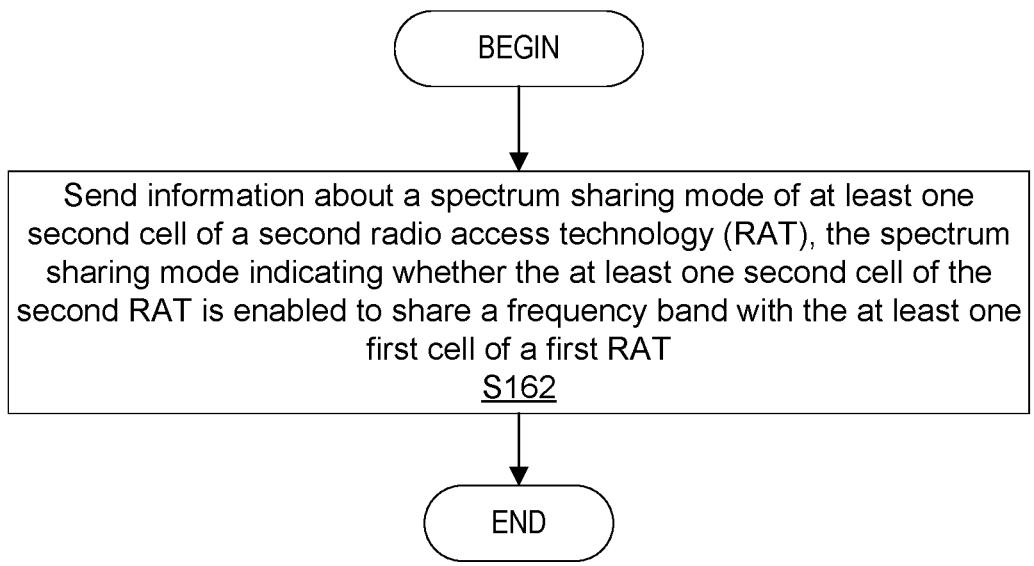
FIG. 12 is a flowchart of an exemplary process in a network node for spectrum sharing indicator unit according to some embodiments of the present disclosure.

FIG. 12 is a flowchart of an exemplary process in a network node 16 (e.g., network node 16b, SgNB) for handling incompatibility according to some embodiments of the present disclosure. One or more Blocks and/or functions and/or methods performed by the network node 16 may be performed by one or more elements of network node 16 such as by SS indicator unit 34 in processing circuitry 68, processor 70, communication interface 60, radio interface 62, etc. according to the example method. The example method includes operating at least one second cell of a second radio access technology, RAT, and the method comprises sending (Block S162), such as by SS indicator unit 34 in processing circuitry 68, processor 70, communication interface 60, radio interface 62, information about a spectrum sharing mode of the at least one second cell of the second RAT, the spectrum sharing mode indicating whether the at least one second cell of the second RAT is enabled to share a frequency band with the at least one first cell of a first RAT.

In some embodiments, one or more of: the first RAT is a Third Generation Partnership Project, 3GPP, Long Term Evolution, LTE RAT and the second RAT is a 3GPP New Radio, NR, RAT; and a network node operating the at least one first cell of the first RAT is an LTE Master eNodeB, MeNB, and the network node operating the at least one second cell of the second RAT is a NR Secondary gNodeB, SgNB. In some embodiments, the information about the spectrum sharing mode of the at least one second cell of the second RAT is sent, such as by SS indicator unit 34 in processing circuitry 68, processor 70, communication interface 60, radio interface 62, via a dual connectivity, DC, X2 setup response message.

Having described the general process flow of arrangements of the disclosure and having provided examples of hardware and software arrangements for implementing the processes and functions of the disclosure, the sections below provide details and examples of arrangements for handling incompatible wireless devices, which may be implemented by one or more network nodes 16, wireless devices 22 and/or host computers 24.

Figure 13:
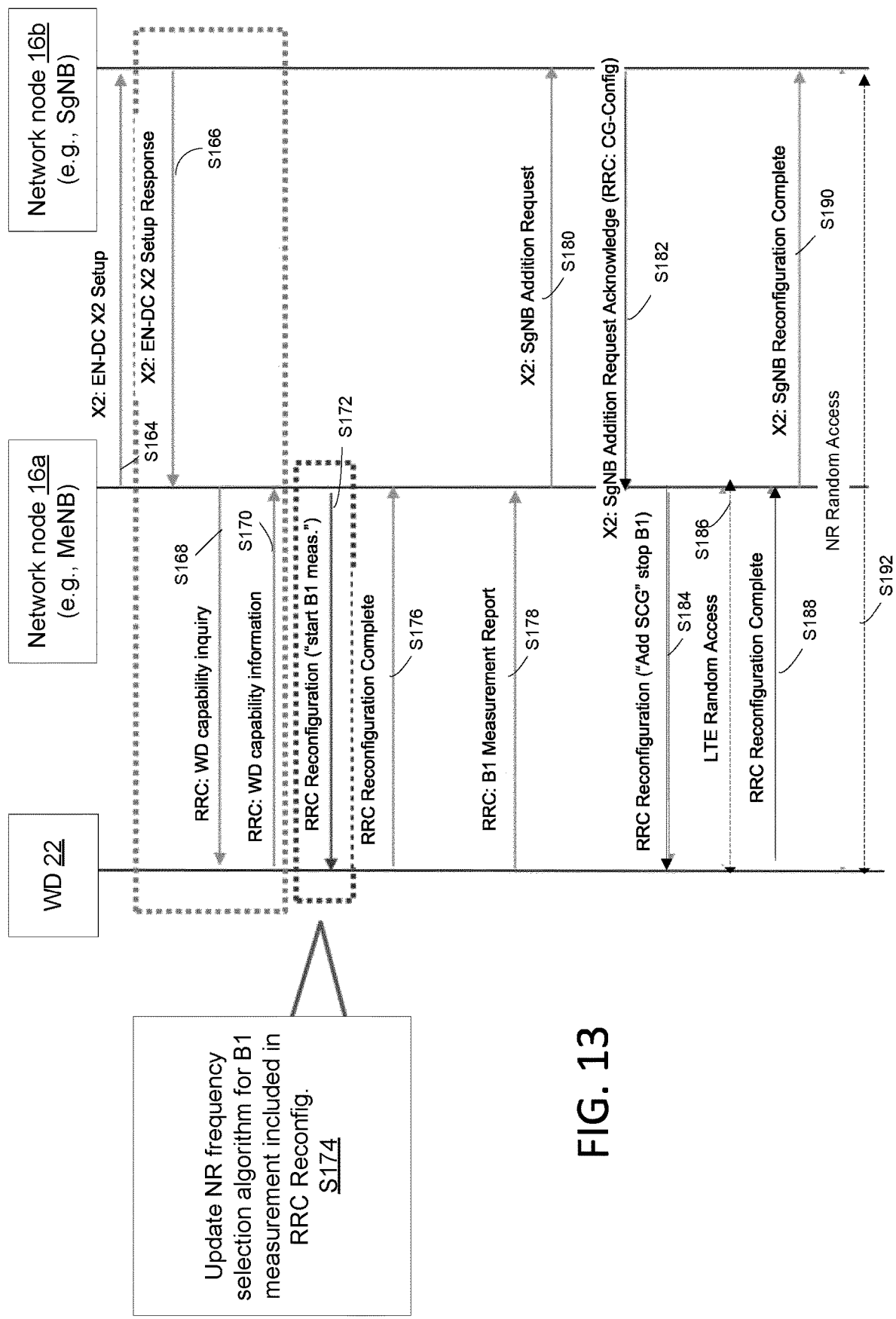
FIG. 13 is a signaling diagram according to some embodiments of the present disclosure.

In some embodiments, network node of one or more NR cells, also called SecondarygNB (SgNB) cell (e.g., network node 16b) associated to a network node of an anchor-LTE cell, also called Master eNB (MeNB) cell (e.g., network node 16a) sends information about the ESS mode of the NR cell. For example, in GutraRelation a new parameter, essEnabled, may be introduced that indicates whether the NSA-NR cell is in ESS operation or not. In some embodiments, this parameter can be set either by operator, or forwarded by the NR network node (SgNB), e.g., network node 16b, over the X2 interface (e.g., connection 21) to the network node of the anchor-LTE cell, e.g., network node 16a. For example, FIG. 13 shows an example signaling diagram, in which, in step S164, network node 16a (e.g., MeNB) sends an EN-DC X2 setup message to network node 16b (e.g., SgNB), which may indicate a request to send information about the ESS mode of the NR cell. In step S166, the network node 16b (e.g., SgNB) then sends an EN-DC X2 Setup Response message, which may indicate the requested information about the ESS mode of the NR cell.

In some embodiments, the network node 16a (e.g., MeNB, also called the network node of the anchor-LTE cell) will store the received essEnabled information for all associated NR cells/carriers.

Continuing with the signaling diagram of FIG. 13, on WD 22 setup, the network node of the anchor-LTE cell, e.g., network node 16a, may inquire about a WD's 22 4G-LTE (EUTRA), EN-DC (EUTRA-NR) and/or 5G (NR) capabilities, such as, for example, sending a request message (e.g., RRC message as in step S168) to the WD 22 indicating a request for such capability information. In step S170, the WD 22 sends the requested capability information to the network node 16a (e.g., MeNB), such as via an RRC message.

As a result of receiving the requested information and/or based on capabilities for ESS (e.g., whether the WD 22 is capable of one or more of LTE CRS rate matching, alternative additional DMRS location and general rate matching pattern, as described herein above), the network node of the anchor-LTE cell, e.g., network node 16a, may categorize the WD 22 as capable or incapable of supporting the particular spectrum sharing arrangement, e.g., ESS capable or ESS incapable.

In some embodiments, based on the matching of WD's 22 particular spectrum sharing arrangement capability and the NR cell's essEnabled parameter, the WD 22 will be configured (e.g., by the network node of the anchor-LTE cell, e.g., network node 16a) for B1 measurement e.g., of the matching NR cell. An example of this is shown in step S172 of FIG. 13, illustrating an RRC reconfiguration message which indicates to the WD 22 to start the B1 measurement. In some embodiments, the process may include, in step S174, updating the NR frequency selection algorithm for the B1 measurement included in the RRC reconfiguration message. Thus, the configuration of the WD 22 to perform the B1 measurement may be considered to be dependent on the WD 22 particular spectrum sharing arrangement, e.g., ESS, capability and/or the NR cell's essEnabled parameter. The remaining steps in the signaling diagram of FIG. 13 may continue as per typical EN-DC procedure.

In step S176, an RRC reconfiguration complete message may be sent to the network node 16a and, in step S178, the WD 22 may send an RRC B1 measurement report. In step S180, network node 16a may send an addition request to network node 16b via an X2 interface. In step S182, network node 16b sends the addition request acknowledgement message vis the X2 interface. In step S184, network node 16a sends an RRC reconfiguration message to the WD 22. In step S186, WD 22 performs LTE random access. In step S188, WD 22 sends RRC reconfiguration complete message. In step S190, network node 16a sends an SgNB reconfiguration complete message to network node 16b via the X2 interface. In step S192, WD 22 performs an NR random access procedure.

In the MeNB (e.g., network node 16a), there may be maintained a GUtranFreqRelation of the NR cells with which EN-DC is possible. In some embodiments, in this GUtranFreqRelation, a new parameter called essEnabled=True/False may be introduced. This essEnabled parameter can either be configured directly by the operator or can be passed via X2 (e.g., connection 21) from gNB (e.g., network node 16b) to eNB (e.g., network node 16a). One embodiment of the new parameter may be represented by the following table, Table 2, showing GUtranFreqRelation in the LTE-anchor having a different essEnabled value (true or false) for each NR cell associated to the LTE-anchor cell.

TABLE 2

| LTE-Anchor | |
|---|---|
| GUtranFreqRelation | essEnabled |
| NR Cell1 | True |
| NR Cell2 | False |

Figure 14:
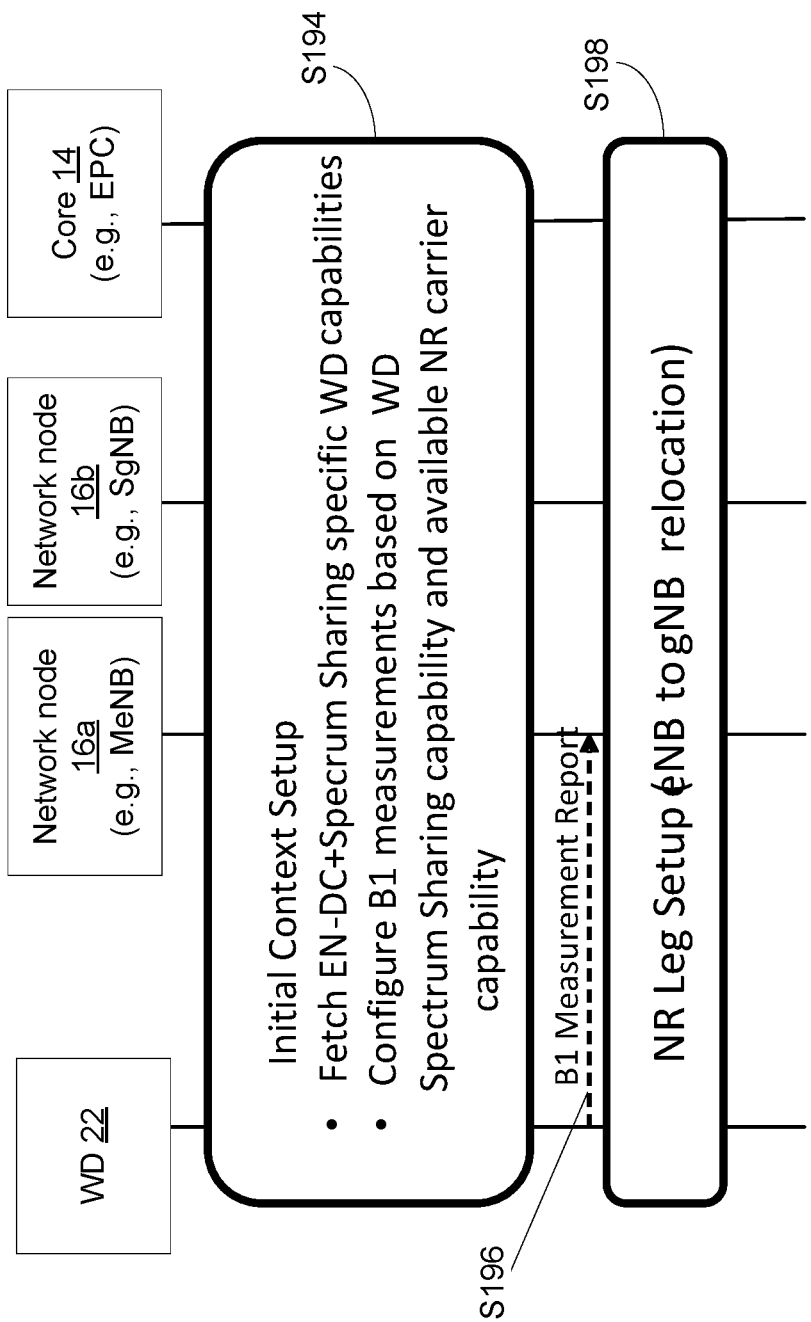
FIG. 14 is a signaling diagram according to some embodiments of the present disclosure.

In some embodiments, as shown in FIG. 14, at Initial Context Setup, in step S192, EN-DC and NR specific WD 22 capabilities are fetched (e.g., by network node 16a) if not received from the core network 14. The MeNB (e.g., network node 16a) may then determine the WD's 22 particular spectrum sharing arrangement capabilities and, based on such WD 22 capabilities, categorize the WD 22 as capable of supporting the particular spectrum sharing arrangement or as not being capable of supporting the particular spectrum sharing arrangement, e.g., ESS. The MeNB (e.g., network node 16a) may configure the WD 22 based on whether the WD 22 is capable or not capable, for example, according to one or more of the following:

- If capable of supporting the particular spectrum sharing arrangement, e.g., ESS capable: configure B1 measurement for all NR cells; and
- If not capable of supporting the particular spectrum sharing arrangement, e.g., ESS incapable:
  - configure B1 measurement for NR cells with essEnabled=False;
  - If no NR cell with essEnabled=False;
    - Consider WD 22 as LTE and do not configure B1 measurement.

In step S196, if the WD 22 is configured for B1 measurement as described above, the WD 22 may perform such B1 measurements and send a B1 measurement report to network node 16a. In step 5198, setup of the NR cell part may be performed.

FIG. 15 illustrates a flowchart for an example process according to some embodiments of the present disclosure and that may be performed by a network node, such as network node 16a (e.g., network node of an anchor-LTE cell). The process includes, in step S200, for every anchor-LTE cell, append essEnabled information to each GUtranFreqRelation NR cell.

FIG. 16 illustrates a flowchart for an example process according to some embodiments of the present disclosure and that may be performed by a network node, such as network node 16a (e.g., network node of an anchor-LTE cell). The process includes, in step S202, where, at WD setup (e.g., RRC connection set-up), eNB (e.g., network node 16a) inquires to the WD 22 about the WD's 22 capabilities (e.g., 4G-LTE (EUTRA), EN-DC (EUTRA-NR) and/or 5G (NR) capabilities). In step S204, network node 16a determines whether or not the WD 22 is capable of supporting the particular spectrum sharing arrangement, e.g., ESS. If the WD 22 is ESS capable, the process may proceed to step S206, where the WD 22 is configured for B1 measurement for NR cell relations. However, if the WD 22 is not capable of supporting the particular spectrum sharing arrangement, the process may proceed to step S208, where network node 16a determines whether or not there are any NR cell relations with essEnabled=False. If there is at least one NR cell relation with essEnabled=False, the process may proceed to step S210, where the WD 22 is configured for B1 measurement for NR cell relations with essEnabled=False. On the other hand, if there is not at least one NR cell relation with essEnabled=False, the process may proceed to step S212, where the WD 22 is not configured for B1 measurement and the WD 22 is treated as a 3GPP Fourth Generation (4G) WD 22.

Figure 17:
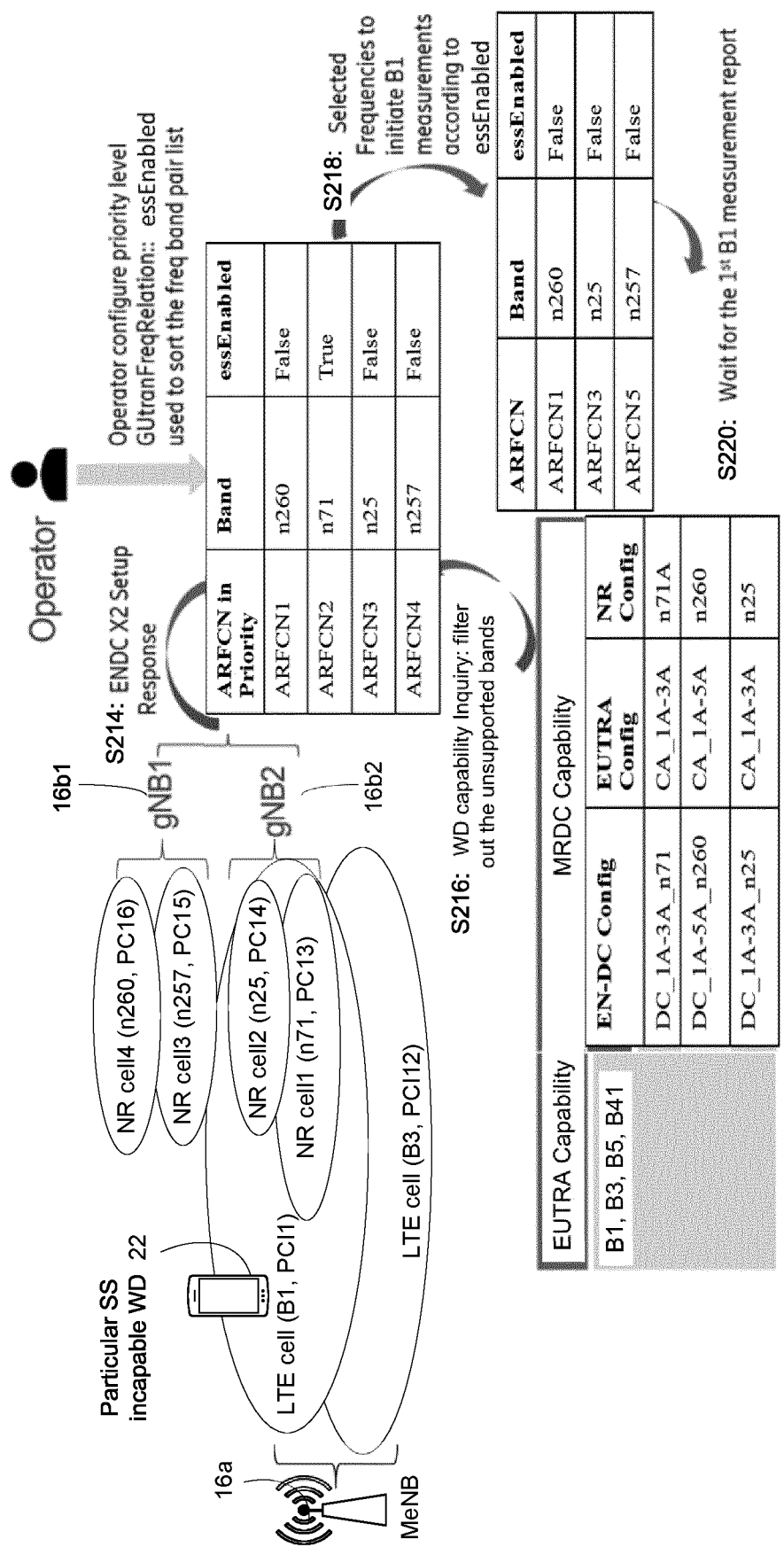
FIG. 17 is a schematic diagram of an example system for supporting spectrum sharing according to some embodiments of the present disclosure.

In FIG. 17, a schematic diagram of an example arrangement is shown according to some embodiments of the present disclosure. The system includes network node 16a (e.g., MeNB) providing LTE cells in which there is located a WD 22 that is not capable of supporting the particular spectrum sharing arrangement, e.g., ESS incapable. The system also includes network nodes 16b1 (e.g., gNB1) and 16b2 (e.g., gNB2) (collectively network nodes 16b) providing NR cells 3 and 4 and NR cells 1 and 2, respectively. FIG. 17 shows that, in step S214, network nodes 16b send an EN-DC X2 setup response message which indicates the bands of the respective cells and, for each band/cell whether or not the particular spectrum sharing arrangement, e.g., ESS, is Enabled (e.g., false or true setting for an essEnabled parameter) (as shown in the corresponding table in FIG. 17, Table 3, reproduced below).

TABLE 3

| ARFCN in Priority | Band | essEnabled |
| --- | --- | --- |
| ARFCN1 | n260 | False |
| ARFCN2 | n71 | True |
| ARFCN3 | n25 | False |
| ARFCN4 | n257 | False |

In step S216, network node 16a sends WD 22 a WD capability inquiry message and the WD 22 may return the WD's 22 capability (e.g., 4G-LTE (EUTRA), EN-DC (EUTRA-NR) and/or 5G (NR) capabilities) (as shown in the corresponding table in FIG. 17, Table 4, reproduced below).

TABLE 4

| EN-DC Config | EUTRA Config | NR Config |
| --- | --- | --- |
| DC_1A-3A_n71 | CA_1A-3A | n71A |
| DC_1A-5A_n260 | CA_1A-5A | n260 |
| DC_1A-3A_n25 | CA_1A-3A | n25 |

Unsupported bands may be filtered out. In step S218, frequencies are selected (e.g., for WD 22) to initiate B1 measurements according to the essEnabled parameter (as shown in the corresponding table in FIG. 17, Table 5, reproduced below).

TABLE 5

| ARFCN | Band | essEnabled |
| --- | --- | --- |
| ARFCN1 | n260 | False |
| ARFCN3 | n25 | False |
| ARFCN5 | n257 | False |

As can be seen by a comparison of Table 3 with Table 5, since the WD 22 is not capable of ESS in this example, only the bands where essEnabled=False are selected for the WD 22 to perform B1 measurements. In this manner, the problem identified above where the WD may repetitively perform B1 measurements for a particular spectrum sharing arrangement enabled NR cell even though the WD does not support the particular spectrum sharing arrangement (and will therefore be rejected by the gNB) may be avoided.

In step S220, the WD 22 may perform B1 measurement on only the NR cells/bands where essEnabled=False and the network node 16a may wait for the B1 measurement report from the WD 22.

Some embodiments may include one or more of the following:

Embodiment A1. A network node operating at least one first cell of a first radio access technology (RAT) and the network node configured to communicate with a wireless device (WD), the network node configured to, and/or comprising a radio interface and/or comprising processing circuitry configured to:
  optionally, receive information about a spectrum sharing mode of at least one second cell of a second RAT, the spectrum sharing mode indicating whether the at least one second cell of the second RAT is enabled to share a frequency band with the at least one first cell of the first RAT;
  request WD capability information, the WD capability information indicating whether the WD is capable of at least one spectrum sharing capability;
  optionally, receive the WD capability information from the WD;
  based at least part on the received WD capability information, determine whether the WD is one of spectrum sharing capable and spectrum sharing incapable; and
  optionally, based at least in part on the determined one of the spectrum sharing capable and spectrum sharing incapable and further based at least in part on the received information about the spectrum sharing mode of the at least one second cell of the second RAT, determine whether to configure the WD for a B1 measurement on the at least one second cell of the second RAT.

Embodiment A2. The network node of Embodiment A1, wherein network node and/or the processing circuitry and/or the radio interface is configured to determine whether to configure the WD for the B1 measurement by being configured to:
  if the WD is spectrum sharing incapable, configure the WD for the B1 measurement only on cells of the at least one second cell of the second RAT that indicated the spectrum sharing mode as not enabled for spectrum sharing; and/or
  if the WD is spectrum sharing capable and the at least one cell of the second RAT has the spectrum sharing mode as enabled for spectrum sharing, configure the WD for the B1 measurement on the at least one second cell of the second RAT.

Embodiment A3. The network node of any one of Embodiments A1 and A2, wherein one or more of:
  the information about the spectrum sharing mode indicates an Ericsson Spectrum Sharing (ESS) mode of the at least one second cell of the second RAT;
  the first RAT is different from the second RAT;
  the first RAT is Third Generation Partnership Project (3GPP) Long Term Evolution (LTE);
  the second RAT is 3GPP New Radio (NR);

the network node is an LTE Master eNodeB (MeNB);
a network node for the at least one second cell of the second RAT is a NR Secondary gNodeB (SgNB);
the at least one spectrum sharing capability of the WD includes at least one of LTE cell-specific reference signal (CRS) rate matching capability, additional demodulation reference signal (DMRS) position for LTE CRS co-existence with NR capability, and general rate matching pattern to map around LTE synchronization signals and physical broadcast channel (PBCH) capability;
the WD capability information indicating the at least one spectrum sharing capability of the WD includes at least one of radio resource control (RRC) parameters rateMatchingLTE-CRS, additionalDMRS-DL-Alt and rateMatchingResrcSetSemi-Static;
the request for WD capability information and the received WD capability information is via RRC connection setup messages; and
the information about the spectrum sharing mode of the at least one second cell of the second RAT is received via a dual connectivity X2 setup response message.

Embodiment B1. A method implemented in a network node operating at least one first cell of a first radio access technology (RAT), the method comprising:
optionally, receiving information about a spectrum sharing mode of at least one second cell of a second RAT, the spectrum sharing mode indicating whether the at least one second cell of the second RAT is enabled to share a frequency band with the at least one first cell of the first RAT;
requesting WD capability information, the WD capability information indicating whether the WD is capable of at least one spectrum sharing capability;
optionally, receiving the WD capability information from the WD;
based at least part on the received WD capability information, determining whether the WD is one of spectrum sharing capable and spectrum sharing incapable; and
optionally, based at least in part on the determined one of the spectrum sharing capable and spectrum sharing incapable and further based at least in part on the received information about the spectrum sharing mode of the at least one second cell of the second RAT, determining whether to configure the WD for a B1 measurement on the at least one second cell of the second RAT.

Embodiment B2. The method of Embodiment B1, wherein determining whether to configure the WD for the B1 measurement further comprises:
if the WD is spectrum sharing incapable, configuring the WD for the B1 measurement only on cells of the at least one second cell of the second RAT that indicated the spectrum sharing mode as not enabled for spectrum sharing; and/or
if the WD is spectrum sharing capable and the at least one cell of the second RAT has the spectrum sharing mode as enabled for spectrum sharing, configuring the WD for the B1 measurement on the at least one second cell of the second RAT.

Embodiment B3. The method of any one of Embodiments B1 and B2, wherein one or more of:
the information about the spectrum sharing mode indicates an Ericsson Spectrum Sharing (ESS) mode of the at least one second cell of the second RAT;
the first RAT is different from the second RAT;
the first RAT is Third Generation Partnership Project (3GPP) Long Term Evolution (LTE);
the second RAT is 3GPP New Radio (NR);
the network node is an LTE Master eNodeB (MeNB);
a network node for the at least one second cell of the second RAT is a NR Secondary gNodeB (SgNB);
the at least one spectrum sharing capability of the WD includes at least one of LTE cell-specific reference signal (CRS) rate matching capability, additional demodulation reference signal (DMRS) position for LTE CRS co-existence with NR capability, and general rate matching pattern to map around LTE synchronization signals and physical broadcast channel (PBCH) capability;
the WD capability information indicating the at least one spectrum sharing capability of the WD includes at least one of radio resource control (RRC) parameters rateMatchingLTE-CRS, additionalDMRS-DL-Alt and rateMatchingResrcSetSemi-Static;
the request for WD capability information and the received WD capability information is via RRC connection setup messages; and
the receiving information about the spectrum sharing mode of the at least one second cell of the second RAT is via a dual connectivity X2 setup response message.

Embodiment C1. A wireless device (WD) configured to communicate with a network node, the WD configured to, and/or comprising a radio interface and/or processing circuitry configured to:
receive a request for WD capability information; and
as a result of the request, send the WD capability information to the network node, the WD capability information indicating whether the WD is capable of at least one spectrum sharing capability.

Embodiment C2. The WD of Embodiment C1, wherein the request for WD capability information and the received WD capability information is via RRC connection setup messages to connect to a Third Generation Partnership Project (3GPP) Long Term Evolution (LTE) Master eNodeB (MeB).

Embodiment C3. The WD of any one of Embodiments C1 and C2, wherein the WD and/or the processing circuitry and/or the radio interface is further configured to:
receive a radio resource control (RRC) reconfiguration message to perform a B1 measurement on at least one cell, the at least one cell having a spectrum sharing mode that matches the WD capability information.

Embodiment C4. The WD of any one of Embodiments C1-C3, wherein:
the at least one spectrum sharing capability of the WD includes at least one of LTE cell-specific reference signal (CRS) rate matching capability, additional demodulation reference signal (DMRS) position for LTE CRS co-existence with NR capability, and general rate matching pattern to map around LTE synchronization signals and physical broadcast channel (PBCH) capability; and
the WD capability information indicating the at least one spectrum sharing capability of the WD includes at least one of radio resource control (RRC) parameters rateMatchingLTE-CRS, additionalDMRS-DL-Alt and rateMatchingResrcSetSemi-Static.

Embodiment D1. A method implemented in a wireless device (WD), the method comprising:
receiving a request for WD capability information; and
as a result of the request, sending the WD capability information to the network node, the WD capability information indicating whether the WD is capable of at least one spectrum sharing capability.

Embodiment D2. The method of Embodiment D1, wherein the request for WD capability information and the received WD capability information is via RRC connection setup messages to connect to a Third Generation Partnership Project (3GPP) Long Term Evolution (LTE) Master eNodeB (MeB).

Embodiment D3. The method of any one of Embodiments D1 and D2, further comprising:

receiving a radio resource control (RRC) reconfiguration message to perform a B1 measurement on at least one cell, the at least one cell having a spectrum sharing mode that matches the WD capability information.

Embodiment D4. The method of any one of Embodiments D1-D3, wherein:

the at least one spectrum sharing capability of the WD includes at least one of LTE cell-specific reference signal (CRS) rate matching capability, additional demodulation reference signal (DMRS) position for LTE CRS co-existence with NR capability, and general rate matching pattern to map around LTE synchronization signals and physical broadcast channel (PBCH) capability; and the WD capability information indicating the at least one spectrum sharing capability of the WD includes at least one of radio resource control (RRC) parameters rateMatchingLTE-CRS, additionalDMRS-DL-Alt and rateMatchingResrcSetSemi-Static.

Embodiment E1. A network node configured to communicate with a wireless device (WD), the network node configured to, and/or comprising a radio interface and/or comprising processing circuitry configured to:

send information about a spectrum sharing mode of at least one second cell of a second radio access technology (RAT), the spectrum sharing mode indicating whether the at least one second cell of the second RAT is enabled to share a frequency band with the at least one first cell of a first RAT.

Embodiment E2. The network node of Embodiment E1, wherein:

the information about the spectrum sharing mode indicates an Ericsson Spectrum Sharing (ESS) mode of the at least one second cell of the second RAT;

the first RAT is different from the second RAT;

the first RAT is Third Generation Partnership Project (3GPP) Long Term Evolution (LTE);

the second RAT is 3GPP New Radio (NR);

the network node is a NR Secondary gNodeB (SgNB);

a network node for the at least one first cell of the first RAT is an LTE Master eNodeB (MeNB); and the information about the spectrum sharing mode of the at least one second cell of the second RAT is sent via a dual connectivity X2 setup response message.

Embodiment F1. A method implemented in a network node, the method comprising:

sending information about a spectrum sharing mode of at least one second cell of a second radio access technology (RAT), the spectrum sharing mode indicating whether the at least one second cell of the second RAT is enabled to share a frequency band with the at least one first cell of a first RAT.

Embodiment F2. The method of Embodiment F1, wherein:

the information about the spectrum sharing mode indicates an Ericsson Spectrum Sharing (ESS) mode of the at least one second cell of the second RAT;

the first RAT is different from the second RAT;

the first RAT is Third Generation Partnership Project (3GPP) Long Term Evolution (LTE);

the second RAT is 3GPP New Radio (NR);

the network node is a NR Secondary gNodeB (SgNB);

a network node for the at least one first cell of the first RAT is an LTE Master eNodeB (MeNB); and the information about the spectrum sharing mode of the at least one second cell of the second RAT is sent via a dual connectivity X2 setup response message.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| NR | New Radio |
| LTE | Long term evolution |
| EN-DC | EUTRA-NR Dual Connectivity |
| MR-DC | Multi-RAT Dual Connectivity |
| RRC | Radio Resource Control |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a wireless device, WD, configured to communicate with a first network node of a Third Generation Partnership Project (3GPP) Long Term Evolution (LTE) cell, the first network node being an LTE Master eNodeB, MeNB, and to communicate with a network node supporting at least one second cell of a second 3GPP New Radio (NR) RAT, the network node of the second RAT being a NR Secondary gNodeB, SgNB, the method comprising:
   receiving, from the first network node, a request for a WD capability information;
   as a result of the request, sending the WD capability information to the first network node, the WD capability information indicating that the WD is capable of at least one spectrum sharing capability, the WD capability information including at least one of radio resource control (RRC) parameters rateMatchingLTE-CRS, additionalDMRS-DL-Alt and rateMatchingResrcSet-Semi-Static;
   the at least one spectrum sharing capability including at least one of:
      an LTE cell-specific reference signal (CRS) rate matching capability;
      an additional demodulation reference signal (DMRS) position for LTE CRS co-existence with 3GPP NR capability; and
      a general rate matching pattern to map around LTE synchronization signals and a physical broadcast channel (PBCH) capability;
   receiving, from the first network node, a reconfiguration message configuring the WD to perform a B1 measurement on at least one 3GPP NR cell; and
   performing the B1 measurement on at least one 3GPP NR cell after receiving the request for WD capability information from the first network node.

2. The method of claim 1, wherein the request for WD capability information and the received WD capability information is via RRC connection setup messages to connect to the 3GPP LTE MeNB.

3. The method of claim 1, further comprising:
   receiving a RRC reconfiguration message to perform the B1 measurement on at least one cell, the at least one cell having a spectrum sharing mode that matches the WD capability information.

4. A method implemented in a first network node operating at least one first cell of a first radio access technology (RAT), the first RAT being a Third Generation Partnership Project (3GPP) Long Term Evolution (LTE) RAT, the first network node being an LTE Master eNodeB, MeNB and a network node supporting at least one second cell of a second 3GPP New Radio (NR) RAT being a NR Secondary gNodeB, SgNB, the method comprising:
   obtaining, from a wireless device (WD), a WD capability information, the WD capability information indicating that the WD is capable of at least one spectrum sharing capability, the WD capability information including at least one of radio resource control (RRC) parameters rateMatchingLTE-CRS, additionalDMRS-DL-Alt and rateMatchingResrcSetSemi-Static;
   the spectrum sharing capability of the WD including at least one of:
      an LTE cell-specific reference signal (CRS) rate matching capability;
      an additional demodulation reference signal (DMRS) position for LTE CRS co-existence with 3GPP NR capability; and
      a general rate matching pattern to map around LTE synchronization signals and a physical broadcast channel (PBCH) capability;
   transmitting, to the network node supporting at least one second cell of a second 3GPP NR RAT, a dual connectivity (DC) X2 setup message;
   receiving information about a spectrum sharing mode of at least one second cell of the second RAT, from the network node supporting at least one second cell of a second 3GPP NR RAT, via a DC X2 setup response message, the spectrum sharing mode indicating that the at least one second cell of the second RAT is enabled to share a frequency band with the at least one first cell of the first RAT;
   based at least in part on the WD being spectrum sharing capable and further based at least in part on the received information about the spectrum sharing mode of the at least one second cell of the second RAT, determining to configure the WD for a B1 measurement on the at least one second cell of the second RAT; and transmitting, to the WD, a reconfiguration message indicating to the WD to start the B1 measurement.

5. The method of claim 4, further comprising:
receiving the WD capability information from at least one of the WD and a core network node.

6. The method of claim 4, wherein determining to configure the WD for the B1 measurement further comprises one or more of:
if the WD is spectrum sharing incapable, configuring the WD for the B1 measurement only on cells of the at least one second cell of the second RAT that indicated the spectrum sharing mode as not enabled for a spectrum sharing; and
if the WD is spectrum sharing capable and the at least one second cell of the second RAT has the spectrum sharing mode as enabled for the spectrum sharing, configuring the WD for the B1 measurement on the at least one second cell of the second RAT.

7. The method of claim 4, wherein the request for WD capability information and the received WD capability information is via RRC connection setup messages.

8. A wireless device, WD, configured to communicate with a first network node of a Third Generation Partnership Project (3GPP) Long Term Evolution (LTE) cell, the first network node being an LTE Master eNodeB, MeNB, and to communicate with a network node supporting at least one second cell of a second 3GPP New Radio (NR) RAT, the network node of the second RAT being a NR Secondary gNodeB, SgNB, the WD comprising processing circuitry, the processing circuitry configured to cause the WD to:
receive, from the first network, a request for a WD capability information;
as a result of the request, send the WD capability information to the first network node, the WD capability information indicating that the WD is capable of at least one spectrum sharing capability, the WD capability information including at least one of radio resource control, RRC, parameters rateMatchingLTE-CRS, additionalDMRS-DL-Alt and rateMatchingResrcSet-Semi-Static;
the at least one spectrum sharing capability including at least one of:
an LTE cell-specific reference signal (CRS) rate matching capability;
an additional demodulation reference signal (DMRS) position for LTE CRS co-existence with 3GPP NR capability; and
a general rate matching pattern to map around LTE synchronization signals and a physical broadcast channel (PBCH) capability;
receive, from the first network node, a reconfiguration message configuring the WD to perform a B1 measurement on at least one 3GPP NR cell; and
perform the B1 measurement on at least one 3GPP (NR) NR cell after receiving the request for WD capability information from the first network node.

9. The WD of claim 8, wherein the request for WD capability information and the received WD capability information is via, RRC connection setup messages to connect to the LTE MeNB.

10. The WD of claim 8, further comprising:
receiving a RRC reconfiguration message to perform the B1 measurement on at least one cell, the at least one cell having a spectrum sharing mode that matches the WD capability information.

11. A first network node configured to communicate with a wireless device, WD, operating at least one first cell of a first radio access technology (RAT), the first RAT being a Third Generation Partnership Project (3GPP) Long Term Evolution (LTE) RAT, the first network node being an LTE Master eNodeB, MeNB and a network node supporting at least one second cell of a second 3GPP New Radio (NR) RAT being a NR Secondary gNodeB, SgNB the first the network node comprising processing circuitry, the processing circuitry configured to cause the network node to:
obtain, from a wireless device (WD), a WD capability information, the WD capability information indicating that the WD is capable of at least one spectrum sharing capability, the WD capability information including at least one of radio resource control (RRC) parameters rateMatchingLTE-CRS, additionalDMRS-DL-Alt and rate MatchingResrcSetSemi-Static;
the spectrum sharing capability of the WD including at least one of:
an LTE cell-specific reference signal (CRS) rate matching capability;
an additional demodulation reference signal (DMRS) position for LTE CRS co-existence with 3GPP NR capability; and
a general rate matching pattern to map around LTE synchronization signals and a physical broadcast channel (PBCH) capability;
transmit, to the network node supporting at least one second cell of a second 3GPP NR RAT, a dual connectivity (DC) X2 setup message;
receive information about a spectrum sharing mode of at least one second cell of the second RAT, from the network node supporting at least one second cell of a second 3GPP NR RAT, via a DC X2 setup response message, the spectrum sharing mode indicating that the at least one second cell of the second RAT is enabled to share a frequency band with at least one first cell of a first RAT;
based at least in part on the WD being spectrum sharing capable and further based at least in part on the received information about the spectrum sharing mode of the at least one second cell of the second RAT, determine to configure the WD for a B1 measurement on the at least one second cell of the second RAT; and
transmit, to the WD, a reconfiguration message indicating to the WD to start the B1 measurement.

12. The first network node of claim 11, further comprising:
receiving the WD capability information from at least one of the WD and a core network node.

13. The first network node of claim 11, wherein determining to configure the WD for the B1 measurement further comprises one or more of:
if the WD is spectrum sharing incapable, configuring the WD for the B1 measurement only on cells of the at least one second cell of the second RAT that indicated the spectrum sharing mode as not enabled for a spectrum sharing; and
if the WD is spectrum sharing capable and the at least one second cell of the second RAT has the spectrum sharing mode as enabled for the spectrum sharing, configuring the WD for the B1 measurement on the at least one second cell of the second RAT.

14. The first network node of claim 11, wherein the request for WD capability information and the received WD capability information is via RRC connection setup messages.

* * * * *